(12) United States Patent
Gass et al.

(10) Patent No.: US 9,981,326 B2
(45) Date of Patent: May 29, 2018

(54) TABLE SAW

(75) Inventors: Stephen F. Gass, West Linn, OR (US); J. David Fulmer, West Linn, OR (US); William L. Emery, Sherwood, OR (US); Paul H. Stasiewicz, Oregon City, OR (US)

(73) Assignee: SawStop Holding LLC, Tualatin, OR (US)

( * ) Notice: Subject to any disclaimer, the term of this patent is extended or adjusted under 35 U.S.C. 154(b) by 1696 days.

(21) Appl. No.: 12/583,384

(22) Filed: Aug. 18, 2009

(65) Prior Publication Data

US 2010/0050843 A1   Mar. 4, 2010

Related U.S. Application Data

(60) Provisional application No. 61/189,412, filed on Aug. 18, 2008.

(51) Int. Cl.
  *B27B 5/24* (2006.01)
  *B23D 45/06* (2006.01)
  *B23D 47/02* (2006.01)
  *B23D 47/12* (2006.01)

(52) U.S. Cl.
  CPC ......... *B23D 45/068* (2013.01); *B23D 45/067* (2013.01); *B23D 47/025* (2013.01); *B23D 47/12* (2013.01); *Y10T 83/773* (2015.04); *Y10T 83/7726* (2015.04); *Y10T 83/8749* (2015.04)

(58) Field of Classification Search
  CPC .. B23D 45/068; B23D 45/067; B23D 47/025; B23D 47/12; Y10T 83/8749; Y10T 83/7726; Y10T 83/773
  USPC ........ 83/471.1, 473, 477.2, 471.3, 491, 581, 83/478, 860; 144/286.1, 286.5
  See application file for complete search history.

(56) References Cited

U.S. PATENT DOCUMENTS

| | | | |
|---|---|---|---|
| 982,312 A | 1/1911 | Swafford | |
| 1,668,061 A | 5/1928 | Falkins | |
| 2,008,673 A * | 7/1935 | Ocenasek | 83/473 |
| 2,038,810 A * | 4/1936 | Tautz | 83/473 |
| 2,075,282 A * | 3/1937 | Hedgpeth | 83/438 |
| 2,131,492 A * | 9/1938 | Ocenasek | 83/473 |
| 2,265,407 A | 12/1941 | Tautz | |
| 2,810,408 A * | 10/1957 | Boice et al. | 83/473 |
| 3,005,477 A | 10/1961 | Sherwen | |
| 3,011,533 A | 12/1961 | Newman, Sr. | |
| 3,368,596 A * | 2/1968 | Comer | 83/473 |
| 3,386,322 A * | 6/1968 | Stone et al. | 83/488 |
| 3,785,230 A | 1/1974 | Lokey | |

(Continued)

FOREIGN PATENT DOCUMENTS

WO   WO 03/006213   1/2003

OTHER PUBLICATIONS

The INCA Woodworking Machinery Handbook—With Useful Tips and Jigs for Everyone, *INCA Maschinen*, 1984.

(Continued)

*Primary Examiner* — Omar Flores Sanchez

(57) ABSTRACT

Table saws and table saws designed to incorporate safety systems are disclosed. The table saws may include vertical slide elevation mechanisms positioned toward the rear of the saw and constructed so that an arbor block and blade can retract when a safety system detects an unsafe condition. Other table saw parts and components are also disclosed.

2 Claims, 22 Drawing Sheets

(56) References Cited

U.S. PATENT DOCUMENTS

| | | | |
|---|---|---|---|
| 3,946,631 A | | 3/1976 | Malm |
| 4,077,161 A | * | 3/1978 | Wyle et al. ................... 451/231 |
| 4,334,450 A | | 6/1982 | Benuzzi |
| 4,721,023 A | * | 1/1988 | Bartlett et al. .................. 83/100 |
| 5,720,213 A | | 2/1998 | Sberveglieri |
| 5,819,625 A | | 10/1998 | Sberveglieri |
| 6,009,782 A | | 1/2000 | Tajima et al. |
| 6,530,303 B1 | | 3/2003 | Parks et al. |
| 6,684,750 B2 | | 2/2004 | Yu |
| 6,722,242 B2 | | 4/2004 | Chuang |
| 6,907,807 B2 | | 6/2005 | Parks et al. |
| 6,948,414 B2 | * | 9/2005 | Henzler et al. ................. 83/473 |
| 6,968,767 B2 | | 11/2005 | Yu |
| 6,986,370 B1 | | 1/2006 | Schoene et al. |
| 7,137,327 B2 | | 11/2006 | Garcia et al. |
| 7,293,362 B2 | * | 11/2007 | Konen ........................... 30/388 |
| 7,628,101 B1 | | 12/2009 | Knapp et al. |
| 7,895,929 B2 | * | 3/2011 | Zhang et al. ................. 83/477.1 |
| 2001/0032534 A1 | | 10/2001 | Ceroll et al. |
| 2001/0035081 A1 | | 11/2001 | Sutton |
| 2002/0096030 A1 | * | 7/2002 | Wang .......................... 83/477.1 |
| 2003/0089212 A1 | | 5/2003 | Parks et al. |
| 2003/0101857 A1 | | 6/2003 | Chuang |
| 2004/0118261 A1 | | 6/2004 | Garcia et al. |
| 2004/0159198 A1 | | 8/2004 | Peot et al. |
| 2004/0194594 A1 | | 10/2004 | Dils et al. |
| 2004/0200329 A1 | | 10/2004 | Sako |
| 2004/0226424 A1 | | 11/2004 | O'Banion et al. |
| 2004/0226800 A1 | | 11/2004 | Pierga et al. |
| 2005/0057206 A1 | | 3/2005 | Uneyama |
| 2005/0166736 A1 | | 8/2005 | Gass et al. |
| 2005/0188806 A1 | | 9/2005 | Garcia et al. |
| 2005/0268767 A1 | | 12/2005 | Pierga et al. |
| 2006/0191393 A1 | | 8/2006 | Zhang et al. |
| 2007/0079683 A1 | * | 4/2007 | Chen ............................... 83/581 |

OTHER PUBLICATIONS

S116WA-WF Circular Saw with Tilting Blade Spare Parts Catalogue, SCMI Corporation, Norcross, GA, Nov. 1986 and 1991.
Inca 2100SE Blade Guard Photos, 1992. 4.
Inca 2100SE Professional Tablesaw Owners Manual, Injecta Machinery, 1992.
Inca 2200 Table Saw Photo of Internal Mechanisms, around 1992.
Skil Model 3400—Type 1 10" Table Saw Parts List and Technical Bulletin, S-B Power Tool Company, Jun. 1993.
SI320 Circular with Tilting Blade Spare Parts Catalogue, SCM, Dec. 23, 1998.
SI3200/3800 Circular with Tilting Blade Spare Parts Catalogue, SCM, Dec. 23, 1998.
Grizzly Industrial, Inc. Heavy-Duty 12" Table Saw Model G5959 and G9957 Parts List, 1998 and Oct. 2001.
Altendorf publication, Wilhelm Altendorf GmbH & Co. KG, Minden, Germany, 1999.
SI300N Circular with Tilting Blade Spare Parts Catalogue, SCM, Jun. 12, 2000.
Bosch Model 4000 Worksite Table Saw Operating/Safety Instructions, S-B Power Tool Company, Jul. 2000.
SI400N Circular with Tilting Blade Spare Parts Catalogue, SCM, Sep. 19, 2000.
DeWalt Woodworker's Table Saw DW746 Instruction Manual, DeWalt Industrial Tool Co., 2000.
SC 3W Circular Saw Manual, SCM Group S.p.A Divisione Minimax—Samco, Feb. 2001.
Ryobi 10" Table Saw BT3000 Operator's Manual, Ryobi Technologies, Inc., Mar. 2001.
SI450E Circular with Tilting Blade Spare Parts Catalogue, SCM, Apr. 26, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Ryobi 10" Table Saw BT3100 Operator's Manual, Ryobi Technologies, Inc., Aug. 2002.
Rojek KPF 300A-xxxx-RN-1P3 Table Saw/Shaper Combination Machine specification sheet, Sep. 30, 2002.
Laguna Tools Signature Series by Knapp, Oct. 21, 2002.
Rojek Circular Saw PK 300 Spare part catalogue, Apr. 14, 2003.
Ridgid TS3650 Operators Manual 10" Cast Iron Table Saw, May 2003, Jun. 2003 and Jul. 15, 2003.
Porter-Cable Double Insulated 10" Bench Top Table Saw Instruction Manual, Porter-Cable Corporation, Sep. 15, 2003.
SI300S-SI300S4 Circular with Tilting Blade Spare Parts Catalogue, SCM, Oct. 30, 2003.
The Legendary Shopsmith Mark V ad, Shopsmith, Inc., at least as early as Jan. 14, 2004.
Makita Model 2704 Exploded Drawings and Parts List, Nov. 2005.
Powermatic WMH Tool Group Operating Instructions and Parts Manual 10-inch Cabinet Saw Model 2000, Nov. 2005.
Porter-Cable 10" Portable Table Saw 3812, Porter-Cable Corporation, 2005.
Porter Cable 10" Portable Table Saw Model 3812 Parts List with Guard Exploded View, 2005.
Grizzly Industrial, Inc. Model G0605X/G0606X Extreme Series 12" Table Saw Owner's Manual, Grizzly Industrial, Inc., Oct. 2006.
WoodNet Forums Woodworking Talk Forum, posting dated Jan. 9, 2008.
Grizzly Industrial, Inc. Model G0651/G0652 10" Extreme Series Table Saws Owner's Manual, Grizzly Industrial, Inc., Mar. 2008.

* cited by examiner

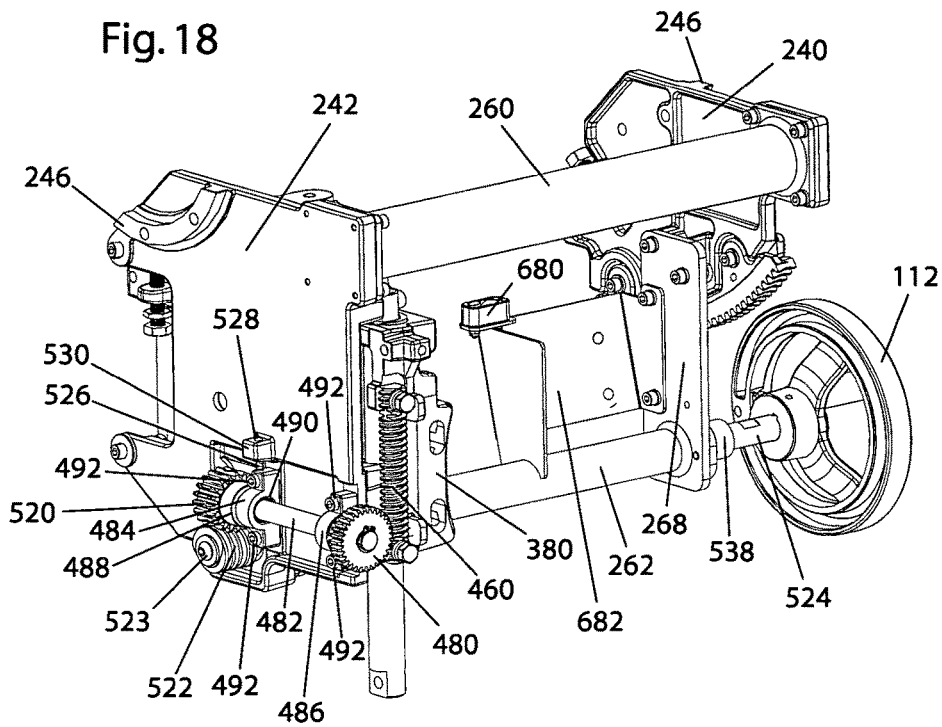
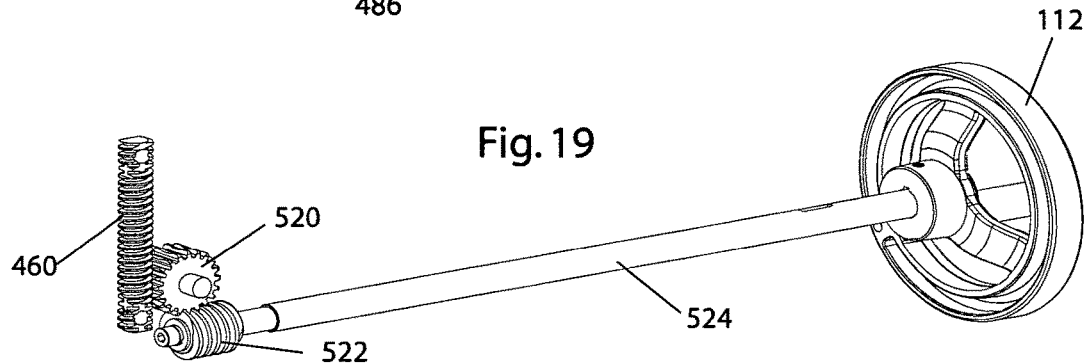
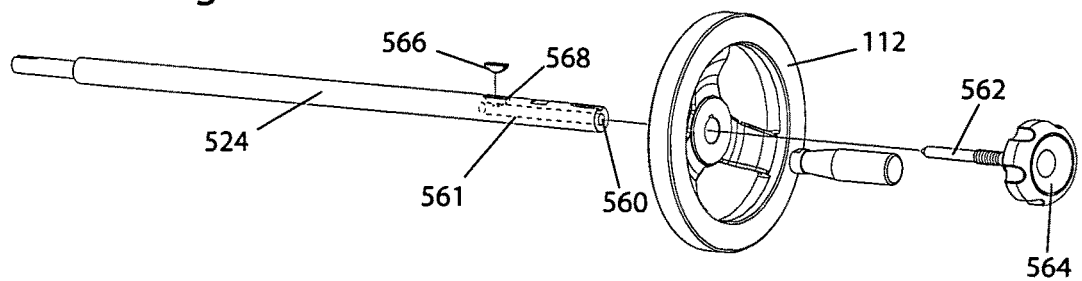

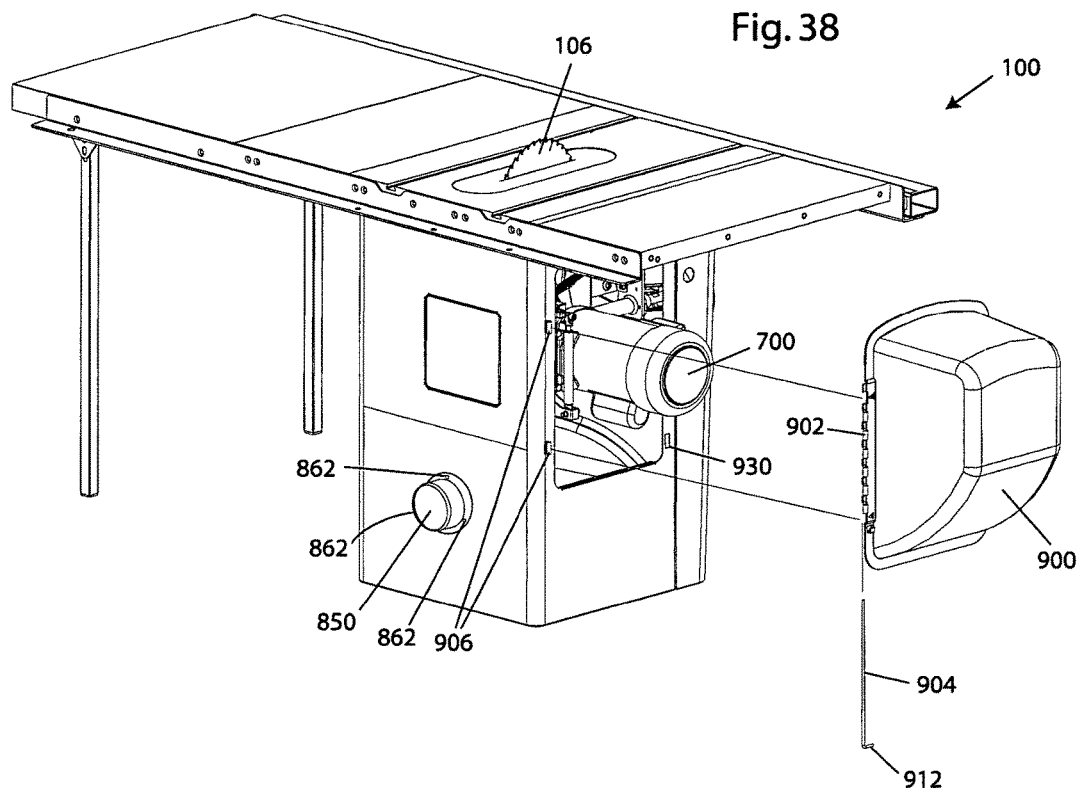
Fig. 38
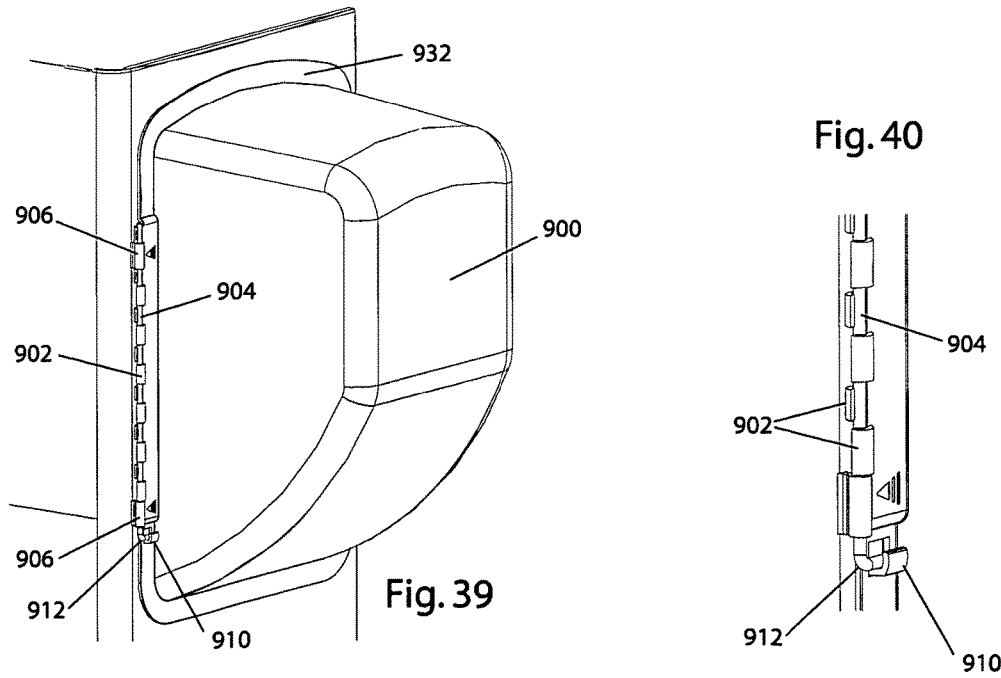
Fig. 39
Fig. 40

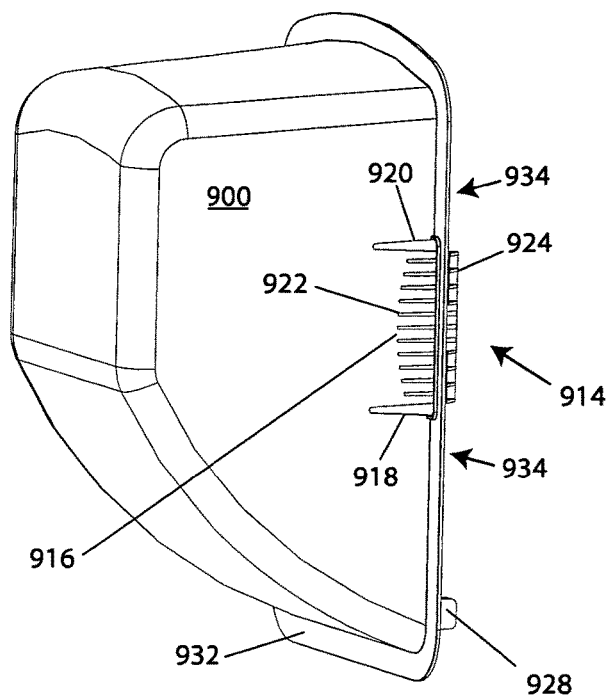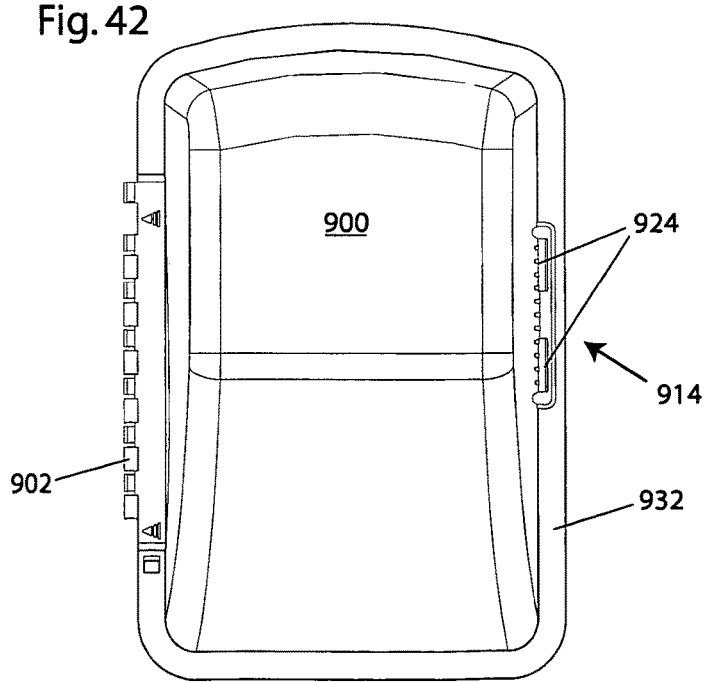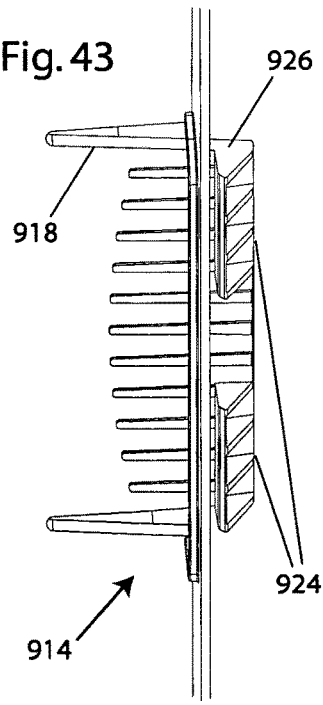

TABLE SAW

CROSS-REFERENCE TO RELATED APPLICATION

This application claims the benefit of and priority from the following U.S. Provisional Patent Application, the disclosure of which is herein incorporated by reference: Ser. No. 61/189,412, filed Aug. 18, 2008.

TECHNICAL FIELD

This specification relates to table saws and table saw components. More specifically, this specification relates to table saws designed to incorporate safety systems.

BACKGROUND

A table saw is a power tool used to cut a work piece to a desired size or shape. A table saw includes a work surface or table and a circular blade extending up through the table. A person uses a table saw by holding a work piece on the table and feeding it past the spinning blade to make a cut. The table saw is one of the most basic machines used in woodworking.

The blade of a table saw, however, presents a risk of injury to a user of the saw. If the user accidentally places their hand in the path of the blade, or if their hand slips or is conveyed into the blade, then the user could receive a serious injury or amputation. Accordingly, safety systems or features are often incorporated into table saws to minimize the risk of injury. One safety system detects a dangerous condition between the user and the blade, such as proximity or accidental contact with the blade, and then reacts to minimize any injury, such as by quickly stopping, retracting, and/or covering the blade.

The present document discloses table saws and table saw components. The disclosed table saws may incorporate a safety system as described.

BRIEF DESCRIPTION OF DRAWINGS

FIG. 18 shows the elevation worm meshed with the worm gear at the back of the rear trunnion.

FIG. 19 shows an alternative elevation mechanism.

FIG. 20 shows a locking mechanism for a handwheel.

FIG. 38 shows the saw of FIG. 3 with a motor cover detached.

FIG. 39 shows the motor cover in FIG. 38 installed on the side of the saw of FIG. 3.

FIG. 40 shows a portion of a hinge for the motor cover of FIG. 38.

FIG. 41 shows the motor cover of FIG. 38 isolated.

FIG. 42 shows another view of the motor cover of FIG. 38 isolated.

FIG. 43 shows a latch mechanism of the motor cover of FIG. 38.

DETAILED DESCRIPTION

Figure 1:
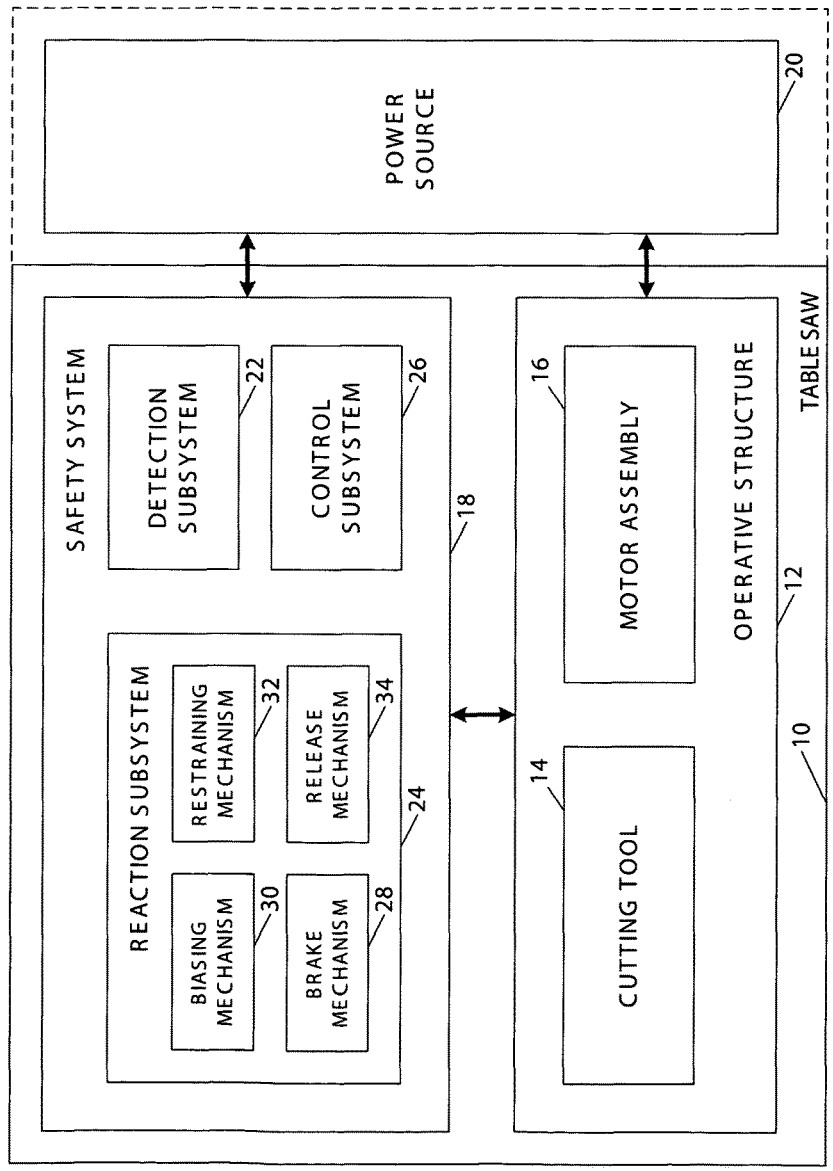
FIG. 1 is a schematic block diagram of a machine with a fast-acting safety system.

A machine that incorporates a safety system to detect and react to a dangerous condition, such as human contact with a designated portion of the machine, is shown schematically in FIG. 1 and indicated generally at 10. Machine 10 may be any of a variety of different machines, such as table saws, miter saws, band saws, jointers, shapers, routers, hand-held circular saws, up-cut saws, sanders, etc. Machine 10 includes an operative structure 12 having a working or cutting tool 14 and a motor assembly 16 adapted to drive the cutting tool. Machine 10 also includes a safety system 18 configured to minimize the potential of a serious injury to a person using the machine. Safety system 18 is adapted to detect the occurrence of one or more dangerous conditions during use of the machine. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms. For example, operative structure 12 may include a stationary housing configured to support motor assembly 16 in driving engagement with cutting tool 14. Alternatively, operative structure 12 may include one or more transport mechanisms adapted to convey a work piece toward and/or away from cutting tool 14.

Motor assembly 16 includes at least one motor adapted to drive cutting tool 14. The motor may be either directly or indirectly coupled to the cutting tool, and may also be adapted to drive work piece transport mechanisms. The particular form of cutting tool 14 will vary depending upon the various embodiments of machine 10. For example, cutting tool 14 may be a single, circular rotating blade having a plurality of teeth disposed along the perimetrical edge of the blade. Alternatively, the cutting tool may be a plurality of circular blades, such as a dado blade or dado stack, or some other type of blade or working tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous or triggering conditions during use of machine 10. For example, the detection subsystem may be configured to detect that a portion of the user's body is dangerously close to or in contact with a portion of cutting tool 14. As another example, the detection subsystem may be configured to detect the rapid movement of a work piece due to kickback by the cutting tool, as is described in U.S. Pat. No. 7,055,417, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Patent Application Publication No. 2002/0017183 A1, entitled "Cutting Tool Safety System," the disclosure of which is herein incorporated by reference. Retracting the cutting tool is described in more detail in U.S. Patent Application Publication No. 2002/0017181 A1, entitled "Retraction System for Use in Power Equipment," and U.S. Patent Application Publication No. 2004/0173430 A1, entitled "Retraction System and Motor Position for Use With Safety Systems for Power Equipment," the disclosures of which are herein incorporated by reference.

The configuration of reaction subsystem 24 typically will vary depending on which action or actions are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
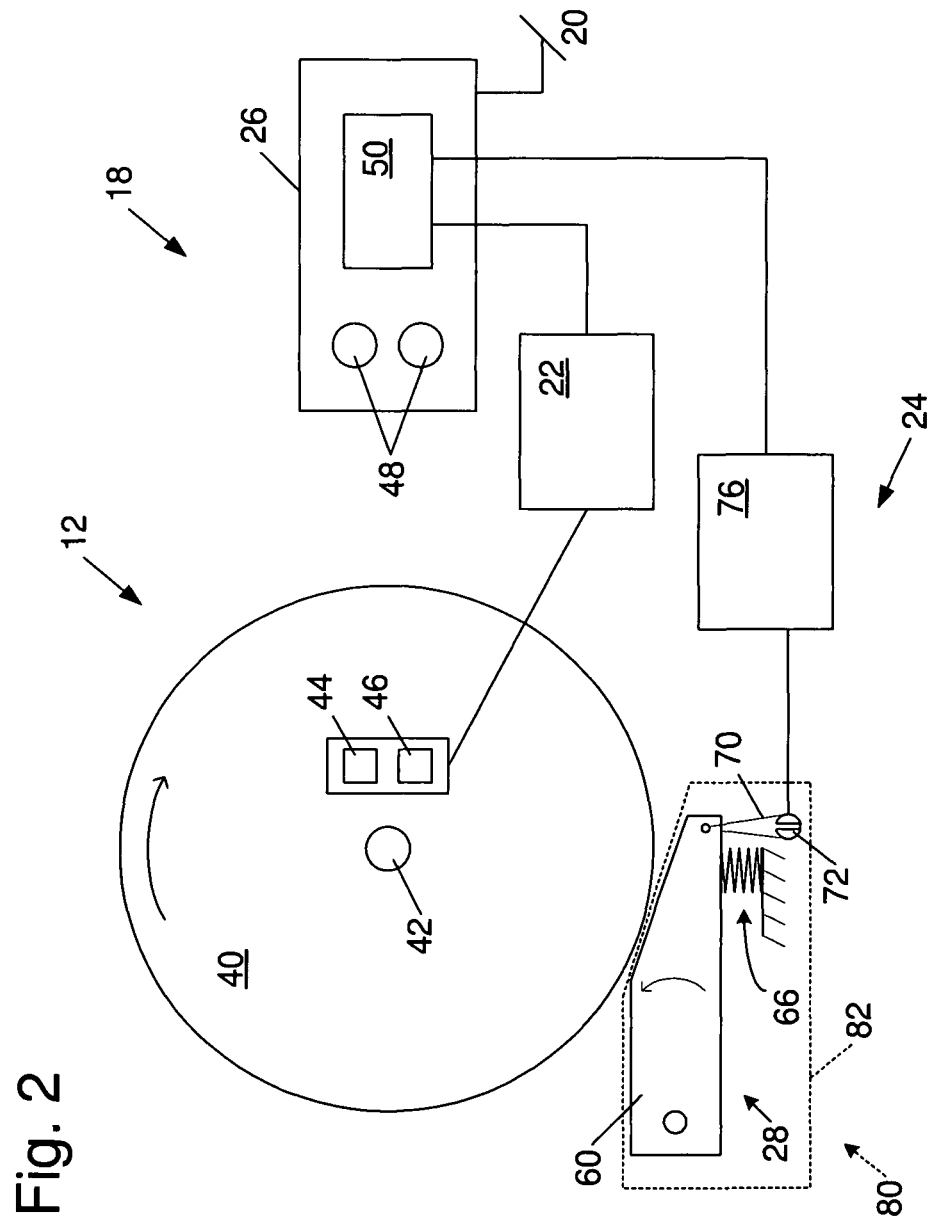
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Patent Application Publication No. 2002/0017175 A1, entitled "Translation Stop For Use In Power Equipment," the disclosure of which is herein incorporated by reference, describes other systems for stopping the movement of the cutting tool. U.S. Patent Application Publication No. 2002/0017184 A1, entitled "Table Saw With Improved Safety System," U.S. Patent Application Publication No. 2002/0017179 A1, entitled "Miter Saw With Improved Safety System," U.S. Patent Application Publication No. 2002/0059855 A1, entitled "Miter Saw with Improved Safety System," U.S. Patent Application Publication No. 2002/0056350 A1, entitled "Table Saw With Improved Safety System," U.S. Patent Application Publication No. 2002/0059854 A1, entitled "Miter Saw With Improved Safety System," U.S. Patent Application Publication No. 2002/0056349 A1, entitled "Miter Saw With Improved Safety System," U.S. Patent Application Publication No. 2002/0056348 A1, entitled "Miter Saw With Improved Safety System," and U.S. Patent Application Publication No. 2002/0066346 A1, entitled "Miter Saw With Improved Safety System," U.S. Patent Application Publication No.

2003/0015253 A1, entitled "Router With Improved Safety System," U.S. Patent Application Publication No. 2002/0170400 A1, entitled "Band Saw With Improved Safety System," U.S. Patent Application Publication No. 2003/0019341 A1, entitled "Safety Systems for Band Saws," U.S. Patent Application Publication No. 2003/0056853 A1, entitled "Router With Improved Safety System," U.S. Patent Application Publication No. 2004/0040426 A1, entitled "Miter Saw With Improved Safety System," U.S. Patent Application Publication No. 2005/0039822 A1, entitled "Woodworking Machines With Overmolded Arbors," U.S. Patent Application Publication No. 2005/0139057 A1, entitled "Table Saws With Safety Systems," U.S. Patent Application Publication No. 2005/0166736 A1 entitled "Table Saws With Safety Systems and Systems to Mount and Index Attachments," and U.S. Patent Application Publication No. 2005/0178259 A1, entitled "Miter Saw With Improved Safety System," the disclosures of which are herein incorporated by reference, describe or relate to safety system 18 in the context of particular types of machines.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Patent Application Publication No. 2002/0017176 A1, entitled "Detection System For Power Equipment," U.S. Patent Application Publication No. 2002/0017336 A1, entitled "Apparatus And Method For Detecting Dangerous Conditions In Power Equipment," U.S. Patent Application Publication No. 2002/0069734 A1, entitled "Contact Detection System for Power Equipment," U.S. Patent Application Publication No. 2002/0190581 A1, entitled "Apparatus and Method for Detecting Dangerous Conditions in Power Equipment," U.S. Patent Application Publication No. 2003/0002942 A1, entitled "Discrete Proximity Detection System," U.S. Patent Application Publication No. 2003/0090224 A 1, entitled "Detection System for Power Equipment," and U.S. Provisional Patent Application Publication No. 2005/0155473 A1, entitled "Improved Detection Systems for Power Equipment," the disclosures of which are all herein incorporated by reference.

Control subsystem 26 includes one or more instruments 48 that are operable by a user to control the motion of blade 40. Instruments 48 may include start/stop switches, speed controls, direction controls, light-emitting diodes, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources such as blade motion sensors, work piece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26, and components that may be used in control system 26, are described in more detail in U.S. Patent Application Publication No. 2002/0020262 A1, entitled "Logic Control For Fast-Acting Safety System," U.S. Patent Application Publication No. 2002/0017178 A1, entitled "Motion Detecting System For Use In Safety System For Power Equipment," U.S. Patent Application Publication No. 2003/0058121 A1, entitled "Logic Control With Test Mode for Fast-Acting Safety System," U.S. Provisional Patent Application Publication No. 2005/0041359 A1, entitled "Motion Detecting System for use in a Safety System for Power Equipment," and U.S. Provisional Patent Application Publication No. 2005/0139459 A1, titled "Switch Box for Power Tools with Safety Systems," the disclosures of which are all herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as fully annealed aluminum, etc. It will be appreciated that the construction of pawl 60 may vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl of the blade reduces the time required for the pawl to engage and stop the blade. Typically, the pawl is held approximately ⅟32-inch to ¼-inch from the edge of the blade by fusible member 70, however other pawl-to-blade spacings may also be used.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Patent Application Publication No.

2002/0020263 A1, entitled "Firing Subsystem For Use In A Fast-Acting Safety System," U.S. Patent Application Publication No. 2002/0020271 A1, entitled "Spring-Biased Brake Mechanism for Power Equipment," U.S. Patent Application Publication No. 2002/0017180 A 1, entitled "Brake Mechanism For Power Equipment," U.S. Patent Application Publication No. 2002/0059853 A1, entitled "Power Saw With Improved Safety System," U.S. Patent Application Publication No. 2002/0020265 A1, entitled "Translation Stop For Use In Power Equipment," U.S. Patent Application Publication No. 2003/0005588 A1, entitled "Actuators For Use in Fast-Acting Safety Systems," and U.S. Patent Application Publication No. 2003/0020336 A1, entitled "Actuators For Use In Fast-Acting Safety Systems," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Patent Application Publication No. 2002/0020261 A1, entitled "Replaceable Brake Mechanism For Power Equipment," U.S. Patent Application Publication No. 2002/0017182 A1, entitled "Brake Positioning System," U.S. Patent Application Publication No. 2003/0140749 A1, entitled "Brake Pawls for Power Equipment," and U.S. Patent Application Publication No. 2005/0039586 A1, entitled "Brake Cartridges for Power Equipment," the disclosures of which are herein incorporated by reference.

While one particular implementation of safety system 18 has been described, it will be appreciated that many variations and modifications are possible. Many such variations and modifications are described in U.S. Patent Application Publication No. 2002/0170399 A1, entitled "Safety Systems for Power Equipment," U.S. Patent Application Publication No. 2003/0037651, entitled "Safety Systems for Power Equipment," and U.S. Patent Application Publication No. 2003/0131703 A1, entitled "Apparatus and Method for Detecting Dangerous Conditions in Power Equipment," the disclosures of which are herein incorporated by reference.

A table saw adapted to implement features of the safety systems described above is shown at 100 in FIG. 3. Saw 100 is often called a cabinet saw or a tilting-arbor saw. The saw includes a table 102 on which a work piece may be cut. The table is supported by a cabinet 104. A blade 106 (shown in FIG. 38) extends up through a slot in a table insert 107 which is fitted into an opening 108 in the table and a blade guard 110 covers the blade. Handwheels 112 and 114 may be turned to adjust the elevation of the blade (the height the blade extends above the table) and the tilt of the blade relative to the tabletop, respectively. In operation, a user turns the handwheels to position the blade as desired and then makes a cut by pushing a work piece on the table past the spinning blade.

Figure 4:
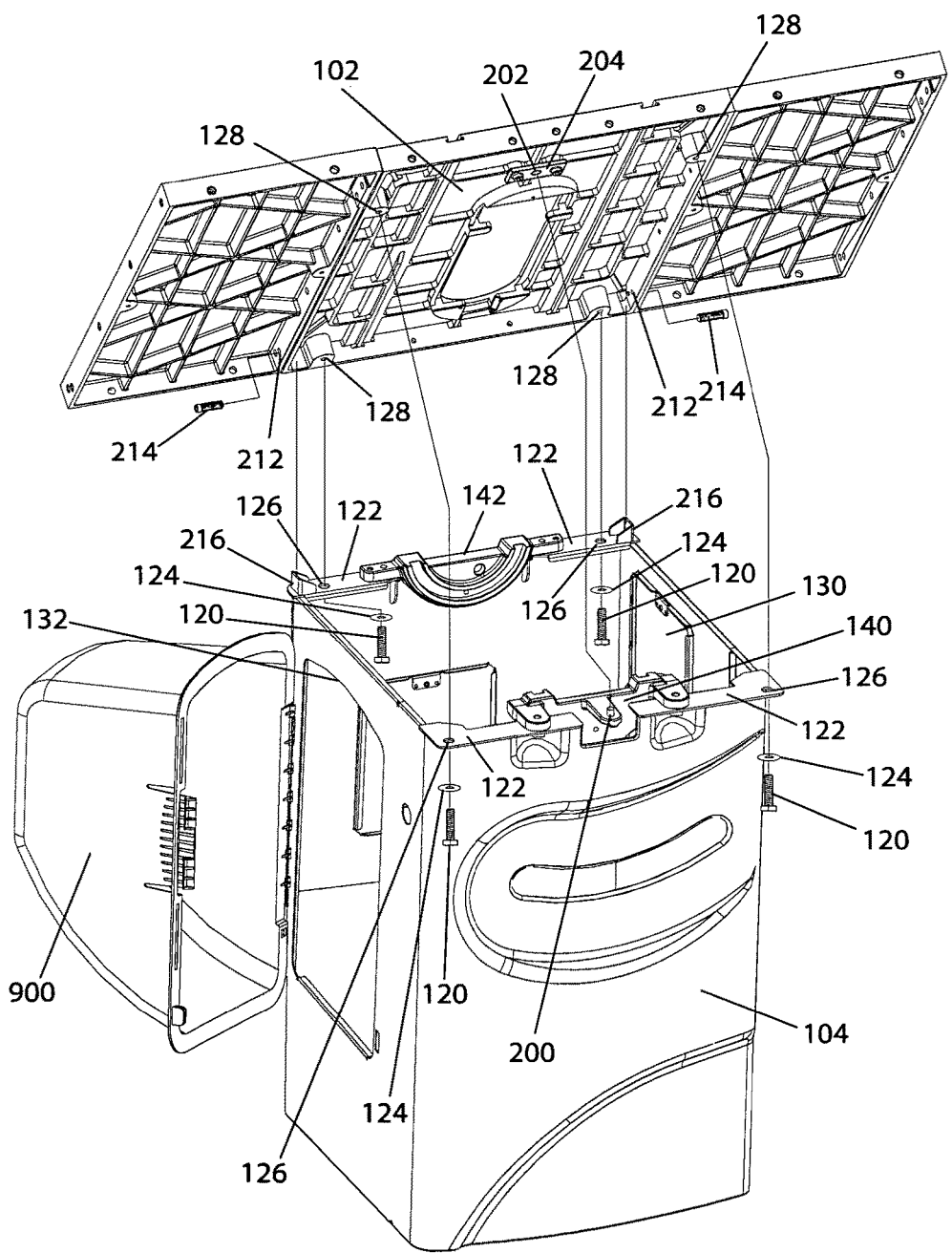
FIG. 4 shows the cabinet of the table saw in FIG. 3 with the table detached.
Figure 5:
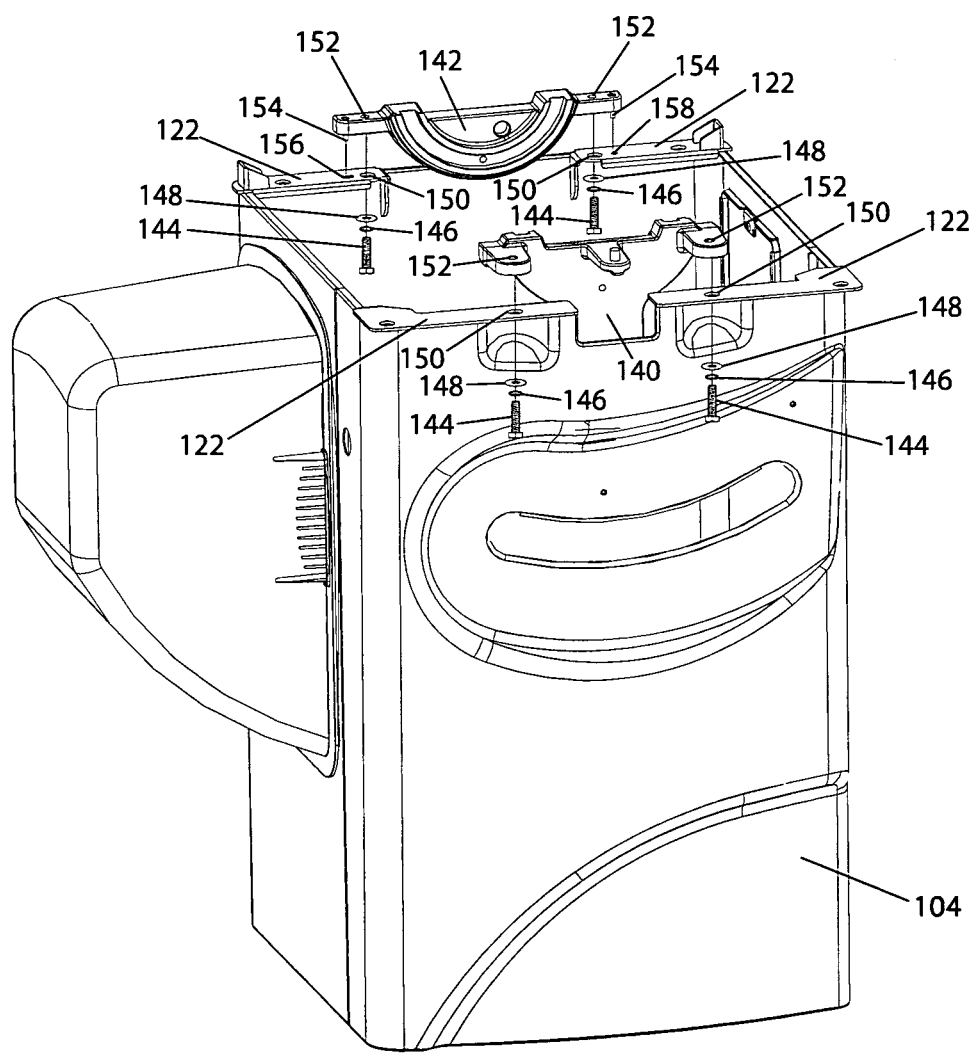
FIG. 5 shows front and rear trunnion brackets in the cabinet of the table saw in FIG. 3 with the table removed.
Figure 6:
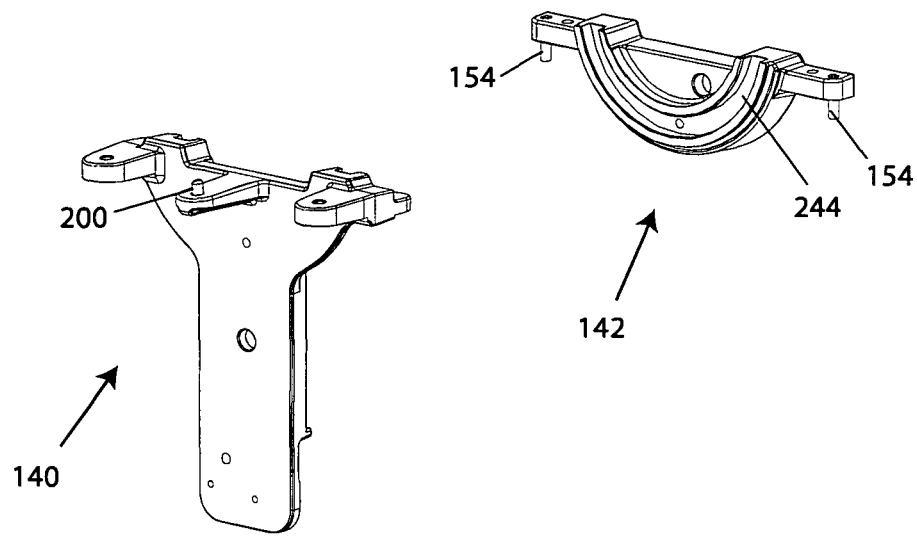
FIG. 6 shows the front and rear trunnion brackets of FIG. 5 isolated from the saw.
Figure 7:
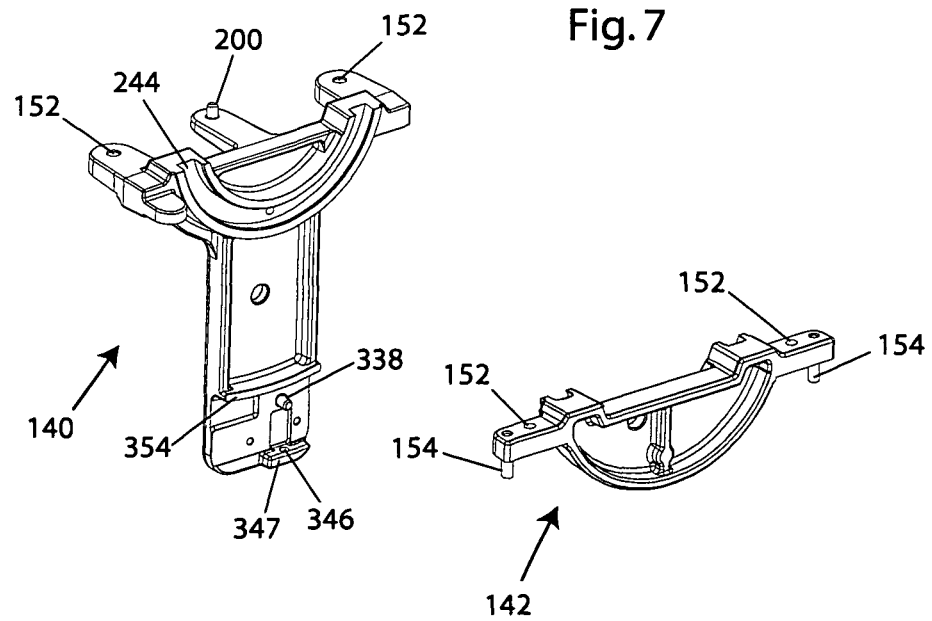
FIG. 7 shows another view of the front and rear trunnion brackets isolated from the saw.

FIGS. 4 and 5 show external views of saw 10. FIGS. 6 through 36 show various components and views of the internal mechanism of the saw. The remaining figures show components and accessories that mount externally to the saw. While saw 100 is adapted to implement features of the safety systems described above, its construction and other features are unique and have utility separate from the safety systems. Many of these features and the construction of saw 100 are also applicable to saws that do not include safety systems as described above.

In saw 100, table 102 is bolted onto cabinet 104 by four bolts 120, as shown in FIG. 4. The cabinet is constructed to support the weight of both the table and the internal mechanism of the saw. There are four metal plates 122 welded to the top of the cabinet such that each plate lies horizontally adjacent a corner of the cabinet. Each bolt 120 passes through a fender washer 124 and then through an oversized hole 126 in a metal plate 122. As will be discussed below, holes 126 are oversized so that when the bolts are loosened some adjustment can be made in the position of the table with regard to the cabinet. Each bolt then screws into a threaded hole 128 in the underside of table 102. Metal plates 122 at the front corners of the cabinet extend outward from the cabinet so that the bolts 120 at the front of the cabinet are accessible. Bolts 120 in the back of the cabinet can be accessed through a cut-out 130 on the right side of the cabinet and through a cut-out 132 on the left side of the cabinet under a cover 900, as shown in FIG. 4. In this implementation, table 102 is secured to the cabinet, but the table could be secured directly to the internal mechanism of the saw or to some other support instead of the cabinet.

Also bolted to metal plates 122 at the front of the cabinet is a front trunnion bracket 140, as shown in FIG. 5, which shows cabinet 104 with the table removed. A rear trunnion bracket 142 is bolted to metal plates 122 at the back of the cabinet. Each bolt 144 passes upward through a lock washer 146, a washer 148, and an oversized hole 150 in a metal plate 122. Each bolt then threads into a hole 152 at the top of each trunnion bracket, one hole on each side of each bracket. The front and rear trunnion brackets 140 and 142 form part of the internal mechanism of the saw and support the rest of the internal mechanism. During assembly, the internal mechanism of the saw, including the front and rear trunnion brackets, is lowered into the cabinet. Two positioning pins 154 are press-fitted into the underside of the rear trunnion bracket and serve to guide the positioning of the internal mechanism as it is placed into the cabinet. The positioning pins fit, respectively, into corresponding hole 156, which is oval, and hole 158, which is circular, in the metal plates 122 on the back left and right corners of the saw. Hole 158 is circular to provide precise positioning while hole 156 is oval to allow for manufacturing tolerances. The front and rear trunnion brackets are shown isolated from the saw in FIGS. 6 and 7.

It is important for table 102 to be positioned properly relative to the blade. Typically, the front edge of the table should be as perpendicular to the plane of the blade as possible in order to make straight, square cuts. There are many mechanisms by which the position of the table relative to the blade can be adjusted. One such mechanism includes a pin 200 which extends up from a flange in front trunnion bracket 140, as shown in FIG. 4. That pin is positioned substantially in the side-to-side center of the front trunnion bracket. Pin 200 extends up into a corresponding socket 202 in a bracket 204 which is bolted on the underside of the front edge of the table. Table 102 is able to pivot around the pin 200 when bolts 120 are loosened or absent. Table 102 includes two holes 212, one in the right rear side of the table and one in the left rear side, as shown in FIG. 4. A positioning screw 214 is threaded into each of those holes and extends through the side of the table. Holes 212 are positioned so that when the positioning screws are threaded through the holes, the ends of the bolts each abut the vertical wall of a U-shaped bracket 216 welded to each of the metal plates 122 at the back right and left corners of the cabinet, respectively. Threading a positioning screw farther into its hole will cause the positioning screw to push against a bracket 216 and the table will then pivot around pin 200. Thus, the position or squareness of the table relative to the blade can be adjusted by threading each positioning screw into its corresponding hole 212 by the amount necessary to pivot the table around pin 200 until the blade is parallel to the miter slots.

Figure 8:
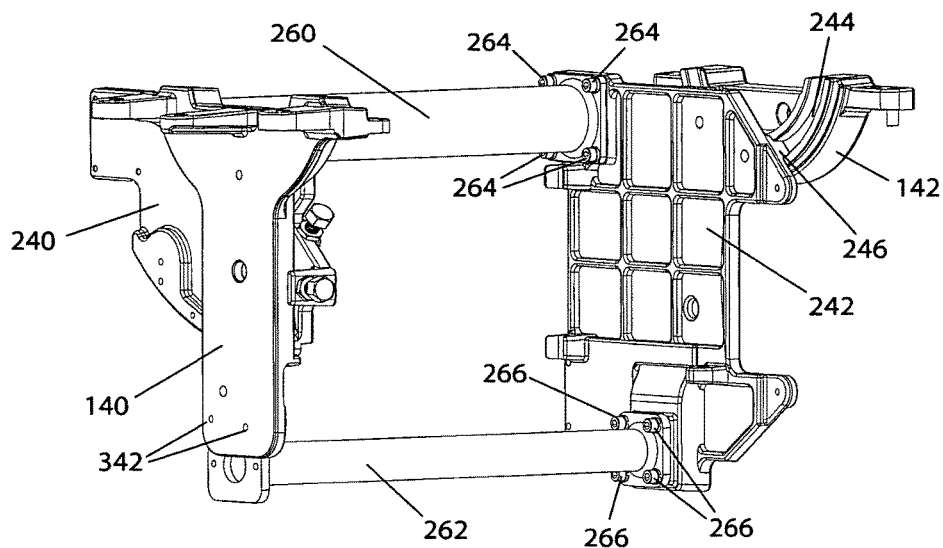
FIG. 8 shows the front and rear trunnion brackets of FIG. 6 with front and rear trunnions and torque tubes attached.
Figure 9:
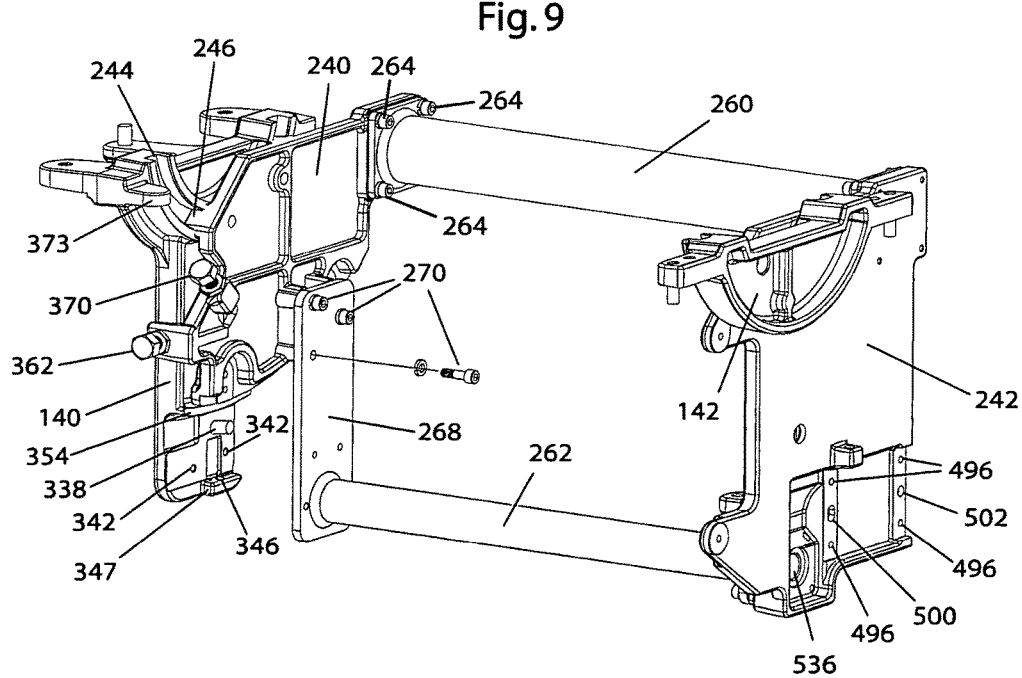
FIG. 9 shows another view of the front and rear trunnion brackets of FIG. 6 with front and rear trunnions and torque tubes attached.

Saw 100 also includes front and rear trunnions 240 and 242. These trunnions are supported in the saw by the front and rear trunnion brackets, respectively, as shown in FIGS. 8 and 9. Each trunnion bracket includes an arcuate groove or channel 244 (best seen in FIGS. 6 and 7), and the front and rear trunnions each include a corresponding arcuate tongue or flange 246 (labeled in FIGS. 8 and 9). Trunnion brackets 140 and 142 support trunnions 240 and 242 by grooves 244 receiving corresponding tongues 246. Alternatively, the tongues and grooves could be reversed so the trunnion brackets include the tongues and the trunnions include the grooves. In this manner, the flanges provide a shoulder or surface on which the trunnions may rest. The arcuate tongue and groove connections also allow the trunnions to slide relative to the trunnion brackets. When the trunnions slide on the trunnion brackets, the blade of the saw tilts relative to the tabletop because the blade is supported by the trunnions, as will be explained below. (The outline or shape of the trunnions and other parts described below may change from what is shown in the figures to minimize material and/or weight.)

Two torque tubes, 260 and 262, extend between the front and rear trunnions so that the trunnions move together, as shown in FIGS. 8 and 9. Torque tube 260 is the primary or main torque tube. It is a hollow tube with a two inch diameter and is sufficiently rigid to stabilize and connect the front and rear trunnions without twisting. Four bolts 264, each with lock washers, are used at each end of torque tube 260 to bolt it to the front and rear trunnions, respectively. Torque tube 262 is a secondary torque tube to further stabilize the trunnions. The secondary torque tube is hollow and also functions as a protective casing for an elevation control shaft 524 which runs through the tube and which will be discussed later. Four bolts 266 are used to bolt one end of torque tube 262 to the rear trunnion, as shown in FIG. 8. The other end of torque tube 262 is welded to a rigid and vertical plate 268 which extends upwards and bolts to front trunnion 240 with three bolts 270, as shown in FIG. 9. The torque tubes hold the front and rear trunnions square and prevent the trunnions from moving off flanges 244 when the mechanism is assembled.

Torque tubes 260 and 262 are positioned to provide clearance for the arbor block and blade to retract, as discussed later. Additionally, the secondary torque tube 262 is positioned low enough to provide clearance for operating elevation handwheel 112 which mounts to the end of elevation control shaft 524 so that a user turning the elevation handwheel will not hit their knuckles on the underside of the table of the saw.

Figure 10:
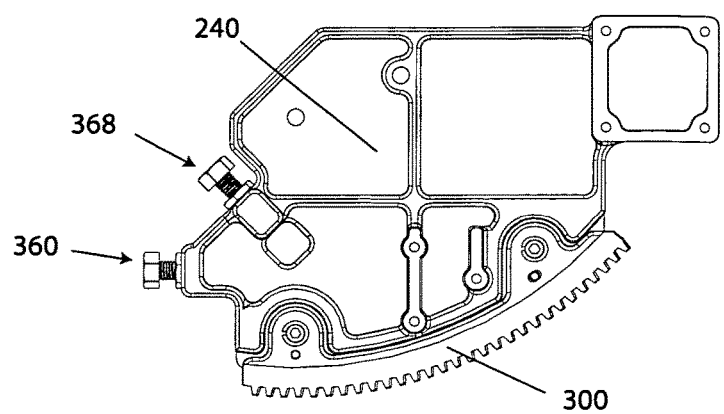
FIG. 10 shows the front trunnion of FIG. 8 isolated.
Figure 11:
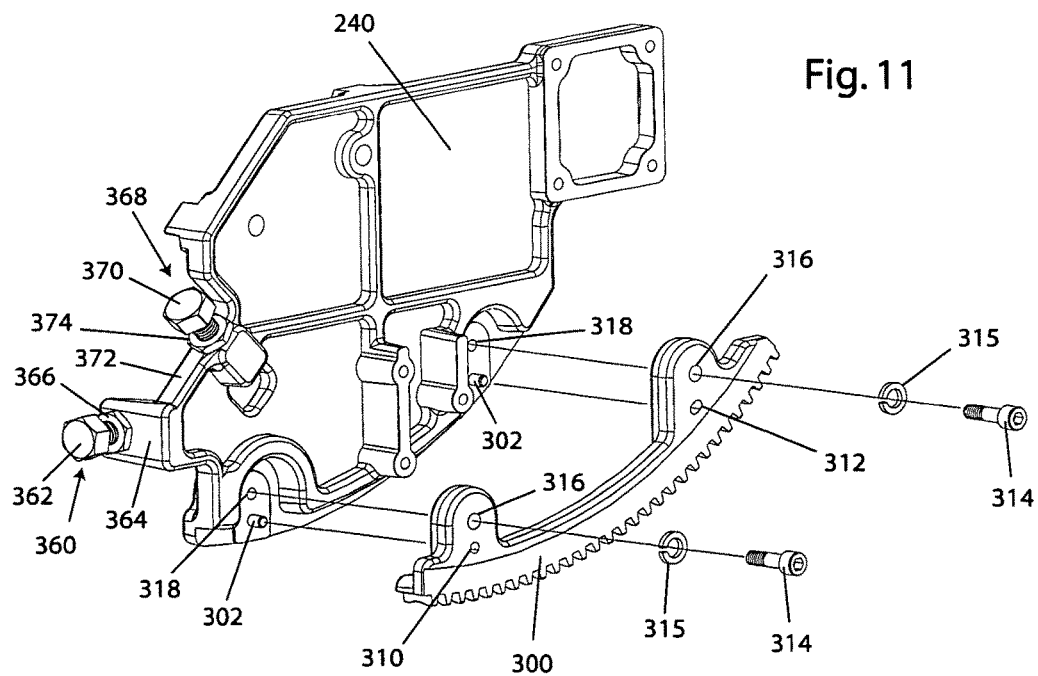
FIG. 11 shows the front trunnion with the sector gear detached.

The trunnions and torque tubes are tilted relative to the trunnion brackets by gears. A sector gear 300 is bolted to the front trunnion such that it runs along the arced bottom edge of the trunnion, as shown in FIG. 10. Two positioning pins 302 are press-fit into holes in the front trunnion and fit into corresponding holes 310 and 312 in the sector gear, as shown in FIG. 11. The positioning pins are used to set the position of the sector gear relative to the front trunnion. Hole 310 on the sector gear has a circular shape corresponding to pin 302 while hole 312 has an oval shape to allow for tolerances in the manufacturing of the sector gear. Designing the holes in this way ensures enough leeway that the sector gear will match up with positioning pins 302 on the front trunnion while maintaining as much accuracy as possible in the positioning of the sector gear. Once positioned, the sector gear is bolted onto the front trunnion with two bolts. Each bolt 314 each passes through a lock washer 315, then through an oversized hole 316 in the sector gear and is threaded into a hole 318 in the front trunnion. The oversized holes 316 in the sector gear allow the sector gear to fit onto the front trunnion despite slight variations in the manufacturing of the parts. In this embodiment, the sector gear is bolted to the front trunnion so that if a tooth of the sector gear breaks the sector gear can be replaced without having to replace the front trunnion. Alternatively, the front trunnion can be designed to include the sector gear with the gear teeth cut into the front trunnion to minimize parts.

Figure 12:
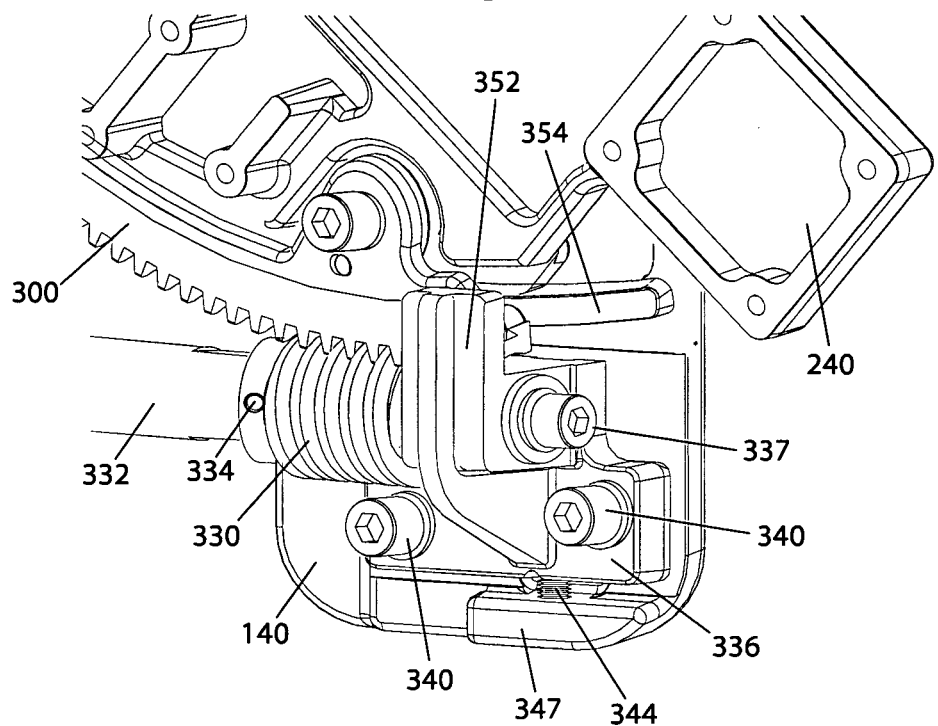
FIG. 12 shows a tilt worm meshed with the sector gear of the front trunnion of FIG. 10 while the front trunnion is tilted.

Sector gear 300 meshes with a worm 330 which is mounted at the end of a shaft 332, as shown in FIG. 12. A pin 334 threads perpendicularly into the worm and then into shaft 332 to attach the worm to the shaft. The tip of shaft 332 just beyond the worm fits into a bore in a bracket 336 and a bolt 337 and washer hold it in place. A positioning pin 338 on the front trunnion bracket (shown in FIG. 9) fits into an oversized hole at the back of bracket 336 and bracket 336 is bolted onto front trunnion bracket 120 by bolts 340 which pass through oversized holes in bracket 336 and thread into holes 342 in the front trunnion bracket. Of course, the oversized holes may be in the front trunnion bracket and the threaded holes may be in bracket 336. The oversized holes allow for adjustment of the position of bracket 336 up or down relative to the front trunnion. A set screw 344 threads into a hole 346 (shown in FIG. 9) on a flange 347 at the bottom of front trunnion bracket 140 underneath bracket 336. The head of the set screw is exposed and the threaded end abuts the bottom of bracket 336. Threading set screw 344 farther into hole 346 causes bracket 336 to be pushed upwards. Being able to adjust the position of the bracket up or down allows adjustment so that the sector gear meshes properly with the worm.

Figure 13:
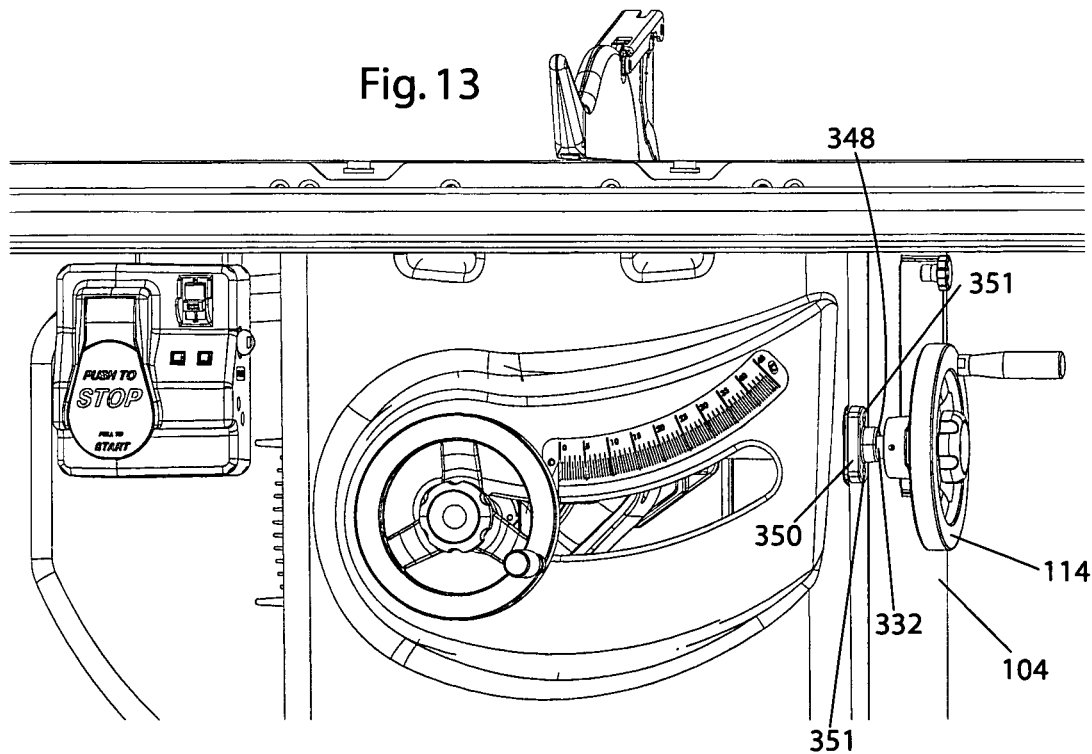
FIG. 13 shows the tilt handwheel extending from the side of the saw of FIG. 3.

Shaft 332 extends out through a hole in the side of cabinet 104 and through a bushing 348 fitted within a bracket 350 that is attached to the cabinet, as shown in FIG. 13. Bracket 350 is bolted to the side of the cabinet with two bolts, the head of which fit within hexagonal head shaped indentations 351 in the bracket. This aids in assembling the saw since the indentations hold the bolts in place as the assembler supports shaft 332 with one hand and tightens the nuts on each bolt with the other. A handwheel 114 is mounted on the end of the shaft. When a user turns handwheel 114 and thus shaft 332, worm 330 crawls along sector gear 300 causing the trunnions and torque tubes to move and the blade to tilt relative to the tabletop. As shown in FIG. 12, bracket 336 includes an arm 352 that overlaps sector gear 330 opposite the front trunnion to help prevent the bottom of front trunnion 240 from moving away from the front trunnion bracket and to help maintain the sector gear in position. In addition, an arced protrusion 354 on the front trunnion bracket runs alongside the side of the sector gear opposite arm 352 on bracket 336 to keep the sector gear within an area between protrusion 354 and arm 352.

Stops 360 and 368, labeled in FIGS. 10 and 11, limit the distance that the trunnions and torque tubes may move. Stop 360 comprises a bolt 362 and a lock nut 366 to hold the bolt in place so that the threaded end of the bolt extends out from the back side of a shoulder 364. Bolt 362 is threaded into and through a hole in shoulder 364 in the front trunnion. Bolt 362 and shoulder 364 are positioned so that the threaded end of the bolt will abut the side of the front trunnion bracket when the front trunnion is at the minimum tilt limit of its movement, as shown in FIG. 9. Stop 368 comprises a bolt 370 threaded into a hole in edge 372 in the front trunnion. A lock nut 374 holds the bolt in place. Bolt 370 is positioned and edge 372 is angled so that the head of the bolt will abut the underside of a shoulder 373 at the top of the front trunnion bracket (as shown in FIG. 9) when the front trunnion is at the maximum tilt limit of its movement. The distance the trunnions may tilt can be adjusted by threading the bolts 362 and 370 in or out, as desired. Of course, bolt 370 could be positioned in shoulder 373, in which case edge 372 would abut the bolt, or bolt 370 could be positioned in other locations.

Figure 3:
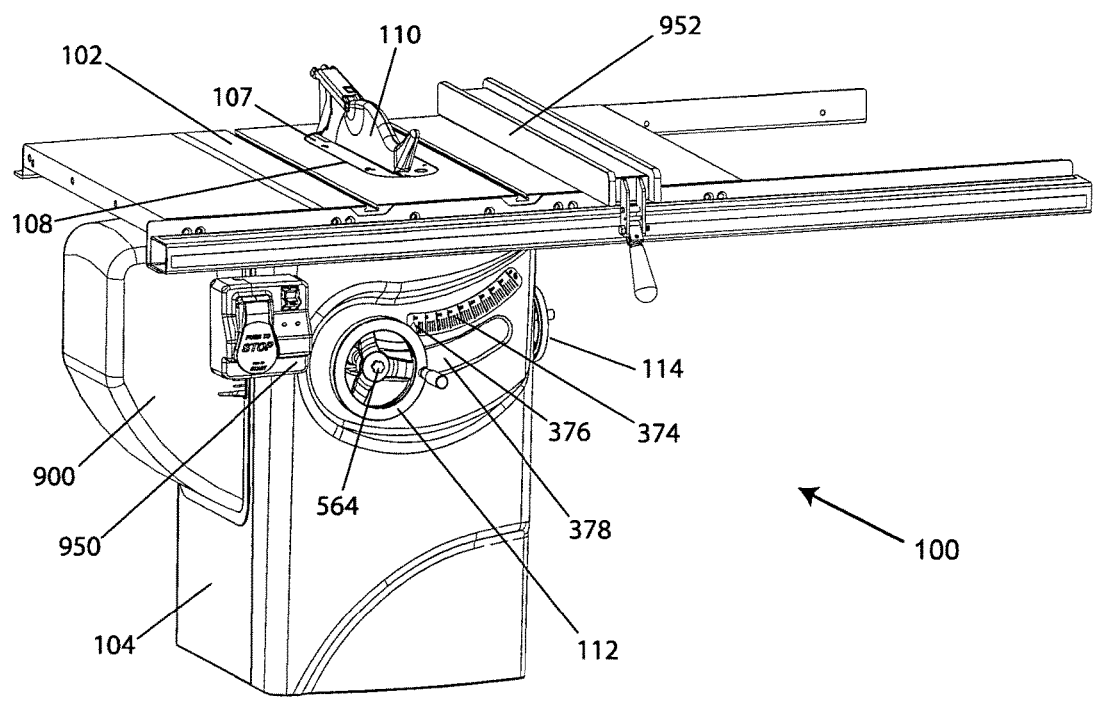
FIG. 3 shows a table saw.

Saw 100 typically includes a label 374 mounted on the front of the cabinet as shown in FIG. 3. Label 374 includes angle demarcations to indicate the degree the blade tilts relative to the tabletop. A tilt indicator 376 (shown best in FIGS. 28 and 33) consisting of a narrow strip of metal with two right-angle bends is bolted at one end to a collar 538 (labeled in FIG. 28) which is mounted on a shaft 524 that extends between the front and rear trunnions and tilts along with them as discussed below. The other end of tilt indicator 376 passes through a curved slot 378 on the front of the cabinet, and is used to point to the angle demarcations on label 374. For instance, when the blade is tilted 45 degrees relative to the tabletop, pointer 376 would point to the 45 degree mark on label 374.

Figure 14:
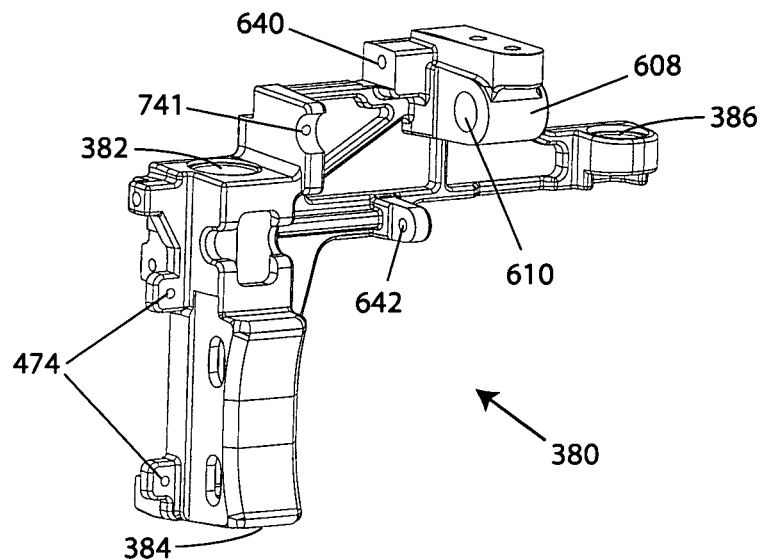
FIG. 14 shows an elevation plate isolated from the saw.
Figure 15:
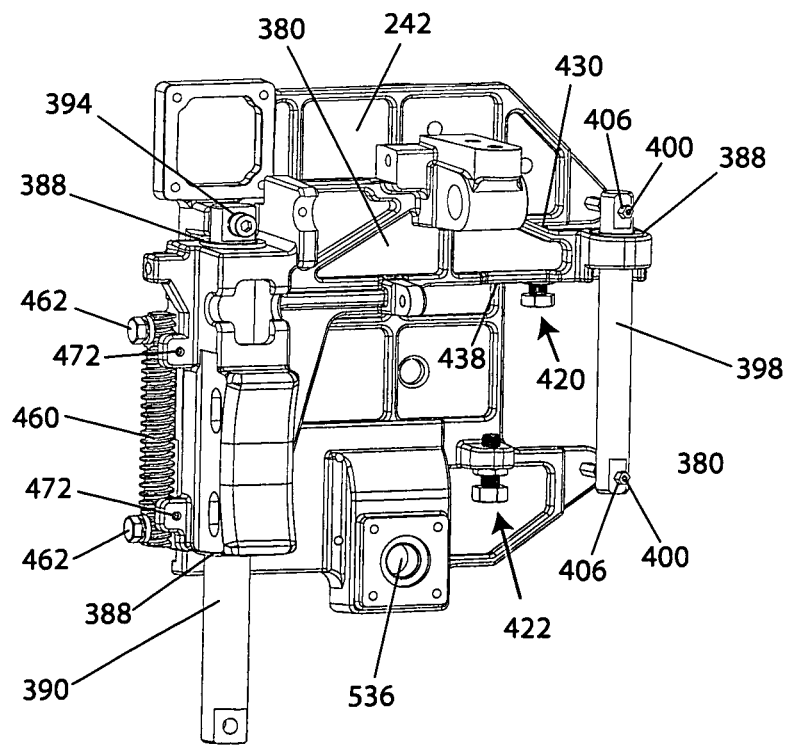
FIG. 15 shows the elevation plate of FIG. 14 attached to the rear trunnion.

Saw 100 also includes an elevation plate 380 shown isolated in FIG. 14. The elevation plate is supported by the rear trunnion, as shown in FIG. 15, and tilts with the front and rear trunnions. The blade is supported on the elevation plate, as will be described, so tilting the elevation plate causes the blade to tilt. The elevation plate is also configured to move up and down relative to the trunnions. Moving the elevation plate up and down is what causes the blade to move up and down relative to table 102. The underside of table 102 may include recesses to allow the blade to rise to a predetermined height without the internal mechanism of the saw bumping into the underside of the table.

Figure 16:
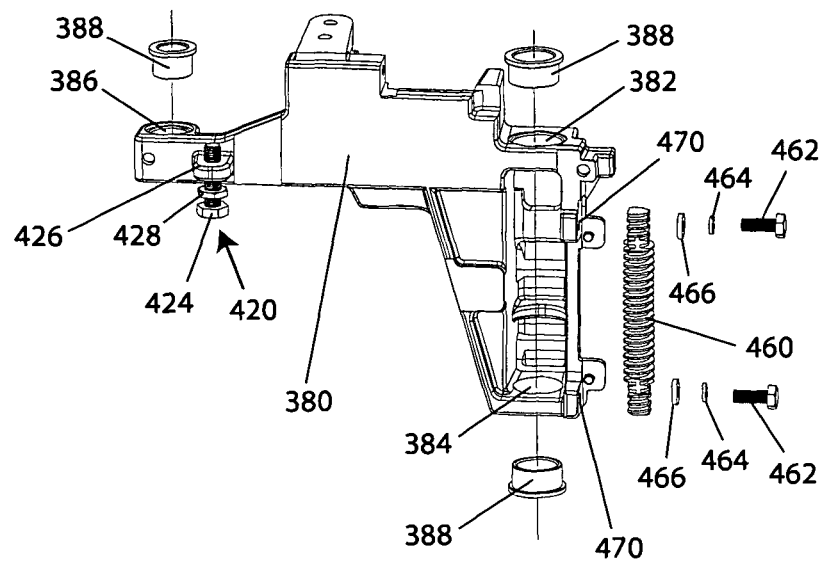
FIG. 16 shows the attachment of a threaded rod to the elevation plate of FIG. 14.
Figure 17:
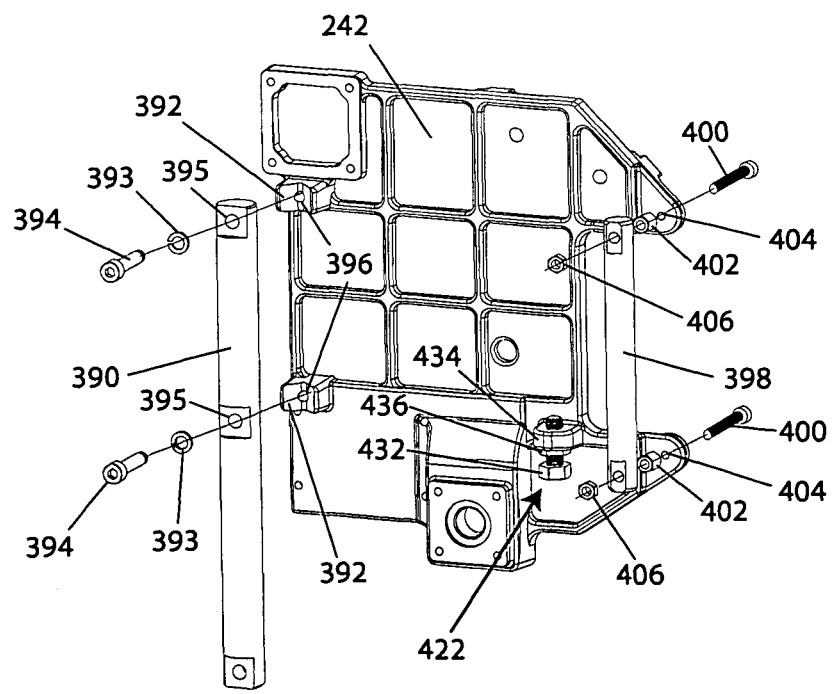
FIG. 17 shows the attachment of elevation shafts to the rear trunnion.

Elevation plate 380 is supported in the saw by a shaft 390 that is oriented vertically at the left side of the elevation plate. The elevation plate includes bores 382 and 384, situated at the top and bottom of the elevation plate, respectively, as shown best in FIG. 16. Shaft 390 supports the elevation plate by passing through these bores. A flanged bushing 388, which may be made from oil impregnated bronze or diluted bronze, is press-fitted into each of the bores and the bushings provide smooth surfaces so that the elevation plate can slide up and down on the shaft. Shaft 390 is bolted onto rear trunnion 242 to hold the elevation plate to the rear trunnion. In the depicted embodiment, shaft 390 fits into two notches 392 in rear trunnion 242 that have angled sides to contact the cylindrical surface of the shaft and center the shaft in the notches, as shown in FIG. 17. Each notch has a threaded hole 396 in the center. One notch is located above the top bushing 388 and the other notch is located above the bottom busing 388. Two bolts 394 each pass through a lock washer 393, then through a hole 395 in shaft 390 and then thread into a hole 396 at the center of each notch 392 in the rear trunnion. One of the holes 395 is located towards the top of shaft 390 and the other near the middle of the shaft to support the shaft in a cantilever position so that the top bushing 388 slides along the shaft between the two holes 395 and the bottom bushing 388 slides along the shaft below the hole 395 that is near the middle of the shaft. Shaft 390 is sufficiently rigid and sized so that the cantilevered lower portion of the shaft does not flex as elevation plate 380 slides along the shaft. Flat areas are carved into the surface of shaft 390 where bolts 394 pass through so that washers 393 may lie flat against the shaft. In this manner the shaft is securely anchored to the rear trunnion.

Elevation plate 380 is also supported by a second shaft 398 located on the right side of the elevation plate and running parallel to shaft 390. This second shaft passes through a bore 386 which is also fitted with a flanged bushing 388, as shown in FIG. 16. Shaft 398 fits into bore 386 and is bolted to the rear trunnion by two long, thin bolts 400. Each bolt 400 threads into a hole 404 in the rear trunnion, passes through a deep nut 402 which acts as a standoff, then extends through shaft 398, where it is secured with a nut 406, as shown in FIG. 17. It is important that elevation plate 380 be restricted from any side-to-side motion or rotation around the longitudinal axis of shaft 390 in order to hold the saw blade straight. Generally, the presence of shaft 398 restricts rotation about shaft 390 but over time and because of manufacturing tolerances in shafts 390 and 398 and their corresponding bores in the elevation plate, some adjustment may need to be made to ensure that the elevation plate is squared with the trunnions. This adjustment can be made by tightening or loosening the long, thin bolts 400 that attach shaft 398 to the rear trunnion.

Elevation plate 380 is free to slide up and down on shafts 390 and 398. Ideally, shafts 390 and 398 would be parallel to each other so that there is no binding as the elevation plate moves up and down. In reality, however, this is difficult to achieve due to variability inherent in the manufacturing and assembly processes. Thus, it is important to be able to adjust the orientation of the shafts relative to each other. This is accomplished by the two long, thin bolts 400. The length of these bolts allow the distance between each end of shaft 398 and the rear trunnion to be adjusted individually by repositioning nuts 406 so that shaft 398 can be set coplanar to shaft 390. The deep nuts 402 aid the user of the saw in adjusting bolts 400 by setting a fixed, repeatable minimum distance each end of the shaft may be from the rear trunnion. The user first rotates nuts 402 and 406 so that the shaft is closest to the rear trunnion and coplanar with the primary elevation shaft 390. Then the user turns each deep nut 402 the same number of turns to move each end of the shaft away from the rear trunnion by the same distance. The thinness of bolts 400 also allows some adjustment in the orientation of the elevation shafts relative to each other. Specifically, the thinness of bolts 400 allows them to flex slightly sideways (toward or away from shaft 390) as needed to allow the shafts to remain parallel within their common plane as the elevation plate moves up and down.

The distance elevation plate 380 may slide up and down on shafts 390 and 398 is ultimately defined by the spacing between notches 392 on the rear trunnion and the spacing between bores 382 and 384 on the elevation plate. That distance, however, may be further defined by adjustable stops 420 and 422 shown in FIGS. 15, 16 and 17. Stop 420 comprises a bolt 424 threaded through a shoulder 426 in the elevation plate and a lock nut 428 to hold the bolt in place, as shown in FIG. 16. The bolt is positioned so that the threaded end of the bolt will abut the underside of the rear trunnion at the limit of the upward movement of the elevation plate, as shown at area 430 in FIG. 15. As shown in FIG. 17, stop 422 comprises a bolt 432 threaded through a shoulder 434 in the rear trunnion and a lock nut 436 to hold the bolt in place. This bolt is positioned so that the threaded end of the bolt will abut underside 438 (labeled in FIG. 15) of the elevation plate at the limit of the downward movement of the elevation plate. The distance the elevation plate may slide up or down is thus defined by how far the stops or bolts extend.

A threaded rod 460, which acts as a rack, is bolted vertically along the left side of elevation plate 380 by bolts 462, as shown in FIGS. 15 and 16. The weight of the elevation plate and all the parts supported by the elevation plate is primarily supported by the threaded rod. Thus, threaded rod 460 is positioned close to the side-to-side center of gravity of the elevation plate and all the parts it supports. Each bolt 462 passes through a lock washer 464, a washer 466, and an oversized hole in the threaded rod, one located towards the top of the threaded rod and the other near the bottom. The oversized holes allow for some adjustment in the position of the threaded rod as described below. Bolts 462 then thread into holes 470 in the side of the elevation plate. Flat areas are cut into the surface of the threaded rod where the bolts pass through so that the washers may lie flat against the threaded rod and the threaded rod can lie flat against the elevation plate.

Threaded rod 460 meshes with a pinion gear 480 mounted on the back of the rear trunnion, as shown in FIG. 18. Two set screws 472, shown in FIG. 15, thread through the elevation plate at holes 474 and press up against flat areas at the top and bottom of the threaded rod. The set screws are oriented at right angles to bolts 462 so that the set screws point towards the back of the saw. The inset hex heads of the set screws are exposed so that the set screws can be screwed into the holes in order to push the threaded rod more towards the back of the saw. The adjustable set screws 472 provide a way to keep the threaded rod meshed with the pinion gear.

Pinion gear 480 resides at one end of a short shaft 482 which extends through two adjustable brackets 484 and 486 that are bolted to the back of the rear trunnion, as shown in FIG. 18. A flanged bushing 488 fits within a bore 490 in each of the brackets and the shaft passes through the bushings. A positioning pin on the back of each bracket is inserted into a corresponding hole in the rear trunnion. The positioning pin of bracket 484 fits into hole 500 and the positioning pin of bracket 486 fits into hole 502 (shown in FIG. 9). Bolts 492 pass through oversized holes in the brackets and thread into holes 496 in the rear trunnion (shown in FIG. 9). Brackets 484 and 486 are made identically and the oversized holes in the brackets allow for some adjustment in the position of bracket 484 as described later.

A worm gear 520 is mounted at the other end of short shaft 482, as shown in FIG. 18. Worm gear 520 meshes with a worm 522 that is mounted at the end of an elongate shaft 524. Shaft 482 allows shaft 524 to be positioned optimally, as explained later. In alternative configurations, shaft 482 and pinion gear 480 may be eliminated and worm gear 520 positioned in the place of pinion gear 480 so that it may drive threaded rod 460 directly when worm 522 turns, as shown in FIG. 19. Worm 522 slides onto the end of shaft 524 and a bolt 523 passes through a washer and threads into a hole at the end of the shaft. A slot in shaft 524 holds a woodruff key that keeps the worm from rotating about the shaft. The worm is mounted in this way because it needs to be attached to shaft 524 after the shaft passes through secondary torque tube 262 which surrounds the shaft. Mounting the pinion gear, worm gear 520 and worm 522 behind the rear trunnion helps to minimize the dust that would otherwise build up on them.

It is important to be able to adjust the vertical position of worm gear 520 in order to maintain the mesh between the worm gear and the worm. Hole 500, into which the positioning pin on the back of bracket 484 is inserted, has an oval shape to allow the vertical position of bracket 484 to be adjusted. A set screw 526 threads vertically down through a hole 528 in a cubed extension 530 which extends outward from the back of the rear trunnion, as shown in FIG. 18. The threaded end of the set screw presses against the top of bracket 484. The inset head of the set screw is exposed so that the set screw can be adjusted. The farther the set screw is screwed into the hole, the farther bracket 484 is pushed downwards.

Shaft 524 passes through a set of flanged bushings fitted into the front and back of a bore 536 (best seen in FIG. 9) in the rear trunnion. Shaft 524 then passes through the hollow center of secondary torque tube 262 which extends from the rear trunnion to the front trunnion bracket and encloses shaft 524. Shaft 524 then passes through a collar 538 (shown best in FIG. 28) which is bolted to torque tube 262 and which holds shaft 524 in place. Shaft 524 extends out through the curved slot 378 in the front of cabinet 104 and a handwheel 112 is mounted on the shaft. When a person turns handwheel 112 and shaft 524, worm 522 causes worm gear 520 to turn, which rotates shaft 482 and causes pinion gear 480 to turn. When pinion gear 480 turns, it crawls along threaded rod 460 causing elevation plate 380 to move up or down. Moving the elevation plate up and down causes the blade to move up and down relative to the tabletop. In this manner, a user may adjust the elevation of the blade.

Once the elevation of the blade is adjusted, handwheel 112 is locked so that it cannot accidentally be turned. The locking mechanism used to lock the handwheel includes a hole 560 at the end of shaft 524 adjacent handwheel 112 which runs along the longitudinal axis of the shaft from the handwheel to collar 538 as shown by the dotted lines 561 in FIG. 20. A section of the hole closest to the end of the shaft is threaded and the rest is not. A long pin 562 with a threaded section at one end is attached at the threaded end to a knob 564. Pin 562 passes through the center of the handwheel and is threaded into hole 560, but not completely. The tip of pin 562 reaches the side of a woodruff key 566 which is shaped like a semi-circle and which sits in a semicircular slot 568 in shaft 524. The woodruff key and slot are positioned under collar 538 so that as knob 564 is turned such that pin 562 threads farther into the hole, pin 562 pushes against the side of the woodruff key forcing that end of the woodruff key upwards against the inside wall of collar 538. By turning knob 564, the woodruff key can be wedged between collar 538 and shaft 524 strongly enough to keep shaft 524 from turning relative to collar 538 thus locking handwheel 112, and thus elevation plate 380, in place. A similar mechanism is used to lock the tilt handwheel 114 in place except that the woodruff key is located in a bushing 348.

The construction of elevation plate 380 and shafts 390 and 398 may be referred to as a vertical slide because the elevation plate slides vertically on the shafts. Other constructions of vertical slides are also possible, such as using one or move dovetail slides or rectangular slides instead of shafts.

Additionally, a motor may be used instead of handwheel 112 to turn the gears necessary to raise or lower the elevation plate, or a motorized lift may be used instead of gears. The motor or lift may be actuated by a typical switch or by a switch configured to be similar to a handwheel. Similarly, a motor could be used instead of the handwheel 114 to control the tilt of the trunnions.

Figure 28:
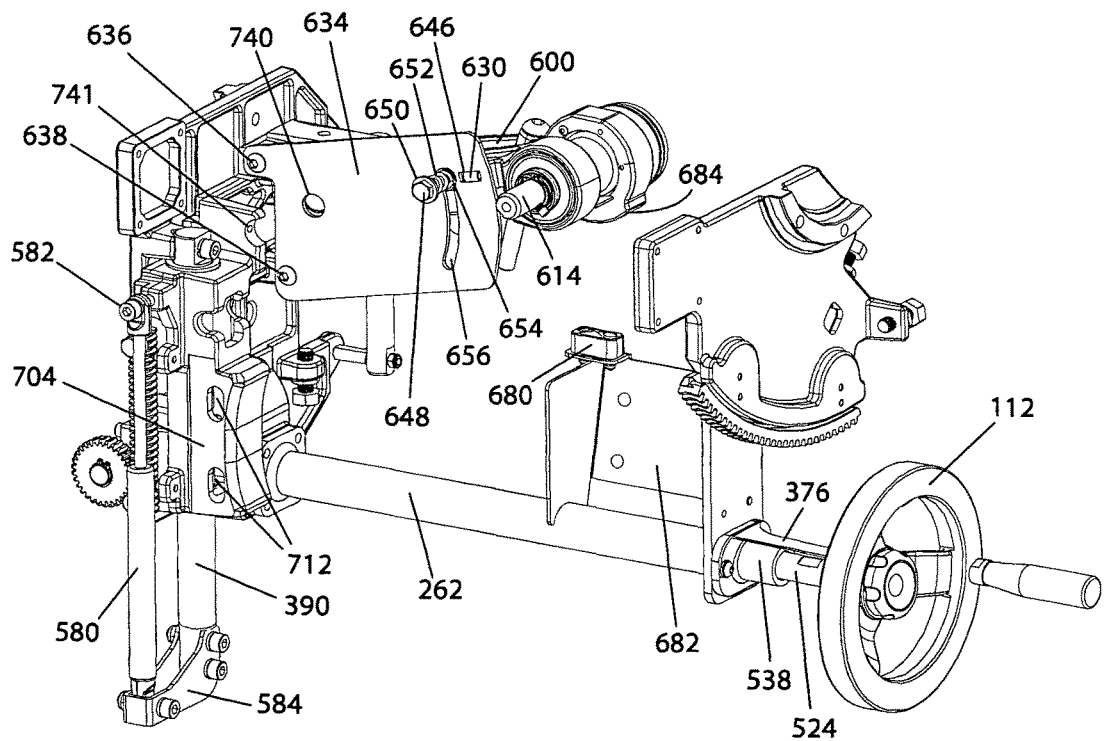
FIG. 28 shows a retraction bracket mounted on the elevation plate of FIG. 14 alongside the arbor block of FIG. 26.

Elevation plate 380, and any components attached to the elevation plate (such as a motor, as will be discussed below), may have significant weight and therefore it may be difficult to turn handwheel 112 to raise the blade. Accordingly, the depicted embodiment includes a gas spring 580 mounted at one end to the left side of the elevation plate by bolt 582, as shown in FIG. 28. The other end of gas spring 580 is bolted to a bracket 584, which in turn is bolted to the bottom of shaft 390. The gas spring is positioned near the side-to-side center of gravity of all the parts supported by the elevation plate and is biased to push the elevation plate up with a predetermined amount of force to make it easy for a user to turn handwheel 112 to raise the blade. The force of the gas spring may be selected so that the elevation plate is biased up or down. Forces in the range of 60 to 100 pounds may be used, depending on how much weight must be lifted.

Figure 21:
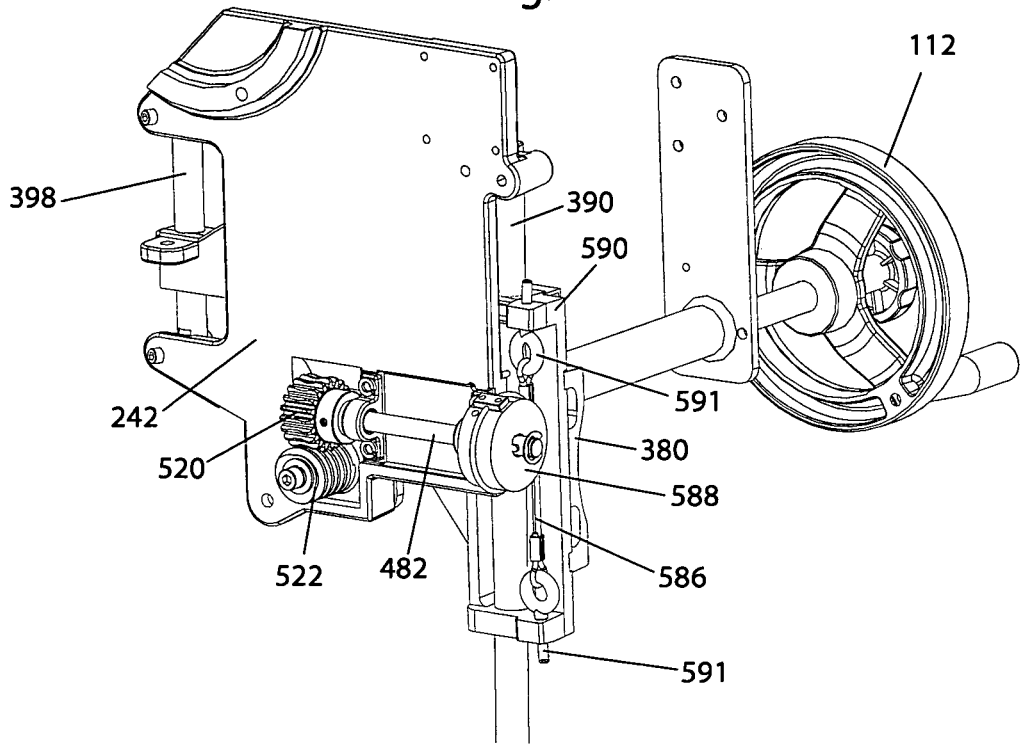
FIG. 21 shows an alternative elevation mechanism.
Figure 22:
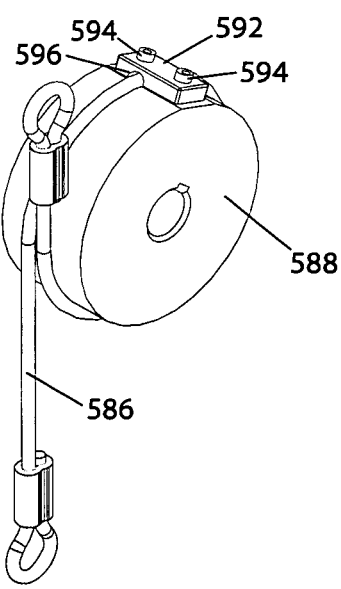
FIG. 22 shows the elevation mechanism of FIG. 21 in a lowered position.
Figure 23:
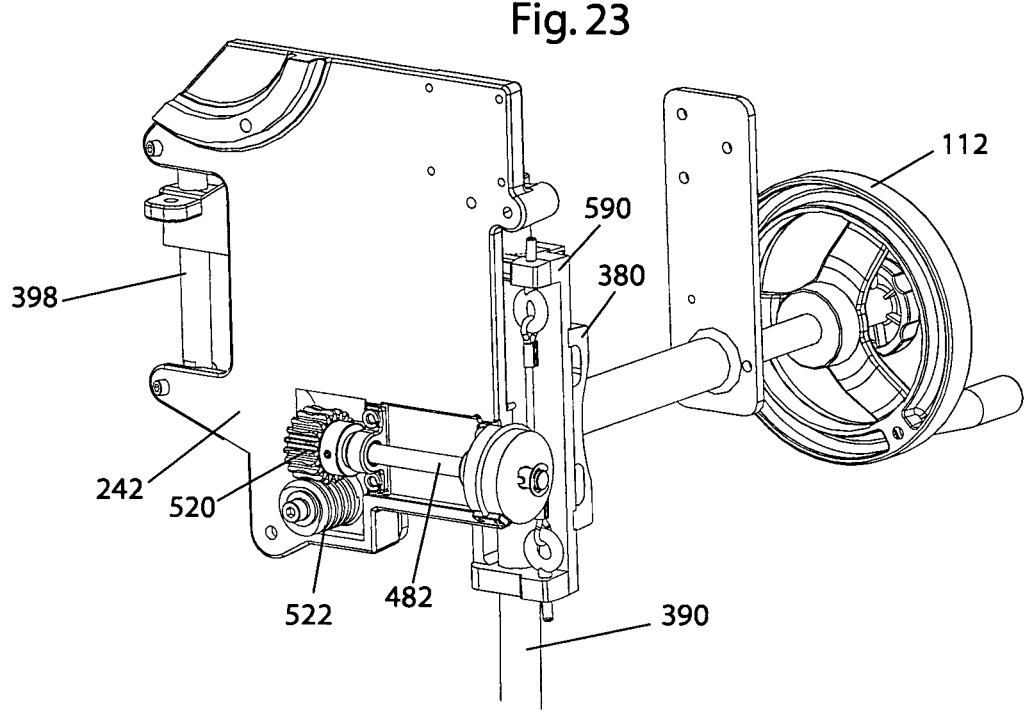
FIG. 23 shows the elevation mechanism of FIG. 21 in a raised position.
Figure 24:
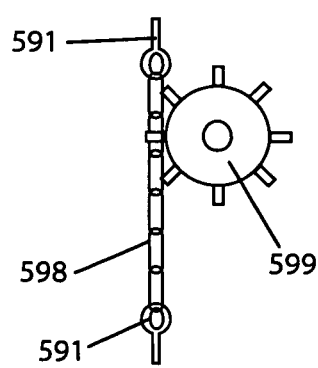
FIG. 24 shows an alternative elevation mechanism using a chain and sprocket.
Figure 25:
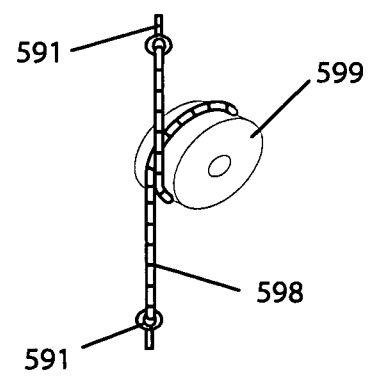
FIG. 25 shows another configuration of an elevation mechanism using a chain and sprocket.

An alternative elevation mechanism is shown in FIG. 21. In this implementation, a cable 586 and spool 588 are used in place of a threaded rod and pinion gear to raise and lower the elevation plate. Cable 586 is a thick wire cable capable of supporting the weight of the motor, elevation plate and everything attached to the elevation plate. Cable 586 is wound once around a spool 588 and is kept taut with each end of the cable fixed to each end respectively of an iron bar 590 that is vertically oriented. The tension in the cable can be adjusted by securing the ends of the cable to the iron bar with eye-bolts 591, for example, which can be threaded into or out of bores in the iron bar. Iron bar 590, in turn, is either attached to the side of elevation plate 380 by bolts or a weld, or may form part of the elevation plate itself. A small, rectangular metal plate 592, shown best in FIG. 22, is attached to spool 588 by two screws 594. Cable 586 fits within a groove 596 located between the two screws on the side of the plate that faces the spool. The cable is sandwiched between the plate and the spool to keep it from sliding on the spool as the spool rotates. Spool 588 is attached to one end of shaft 482 and the other end of the shaft is attached to worm gear 520. As the worm turns the worm gear, spool 588 rotates and causes the position of the cable winding around the spool to change position relative to and along the length of the cable. Because the spool is at a fixed location in the saw, the iron bar 590 to which the two ends of the cable is attached is forced up or down depending on which way spool 588 rotates. When the top of spool 588 rotates toward the front of the saw, cable 586 pulls the top end of iron bar 590 downward. When the top of spool 588 rotates away from the front of the saw, cable 586 pulls the bottom end of iron bar 590 upwards. As iron bar 590 moves up and down, the elevation plate and all attached to it moves up and down, sliding on the primary and secondary elevation shafts. FIG. 21 shows the elevation plate in a lowered position and FIG. 23 shows the elevation plate in a raised position. Spool 588 is sized such that the spool need only rotate about half a revolution in order for the elevation plate to move through the full range of vertical motion necessary. Plate 592 is fixed to the spool at a location that allows the spool to rotate without interference from the plate hitting the vertical stretch of cable. An alternative configuration may use a chain 598 and sprocket 599 in place of a cable and spool. The chain may be oriented vertically and contact the sprocket for a varying length along the sprocket, one example of which is shown in FIG. 24, or it may wrap around the sprocket, as shown in FIG. 25. Still other configurations may use miter or bevel gears instead of a worm or worm gear in the elevation mechanism.

Figure 26:
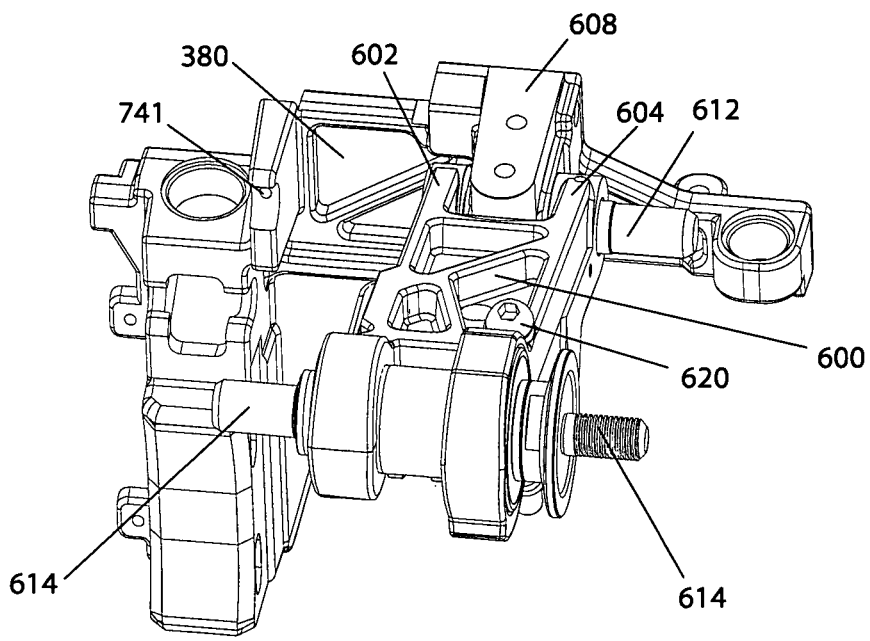
FIG. 26 shows an arbor block mounted on the elevation plate of FIG. 14.
Figure 27:
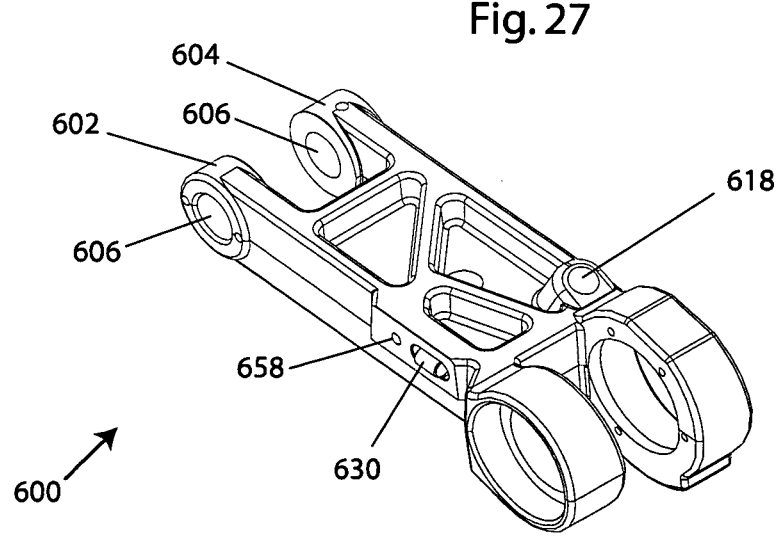
FIG. 27 shows the arbor block of FIG. 26 isolated.

An arbor block 600 is pivotally mounted to the elevation plate as shown in FIGS. 26 and 28. The arbor block includes two projections 602 and 604, each projection having a bore 606, as shown in FIG. 27. The elevation plate includes a support flange 608 and a bore 610 extends through that support flange, as shown in FIG. 14. Projections 602 and 604 on the arbor block sandwich support flange 608, and a shaft 612 passes through bores 606 in the arbor block and bore 610 in the elevation plate to mount the arbor block to the elevation plate. Arbor block 600 may then pivot up and down around shaft 612.

Figure 33:
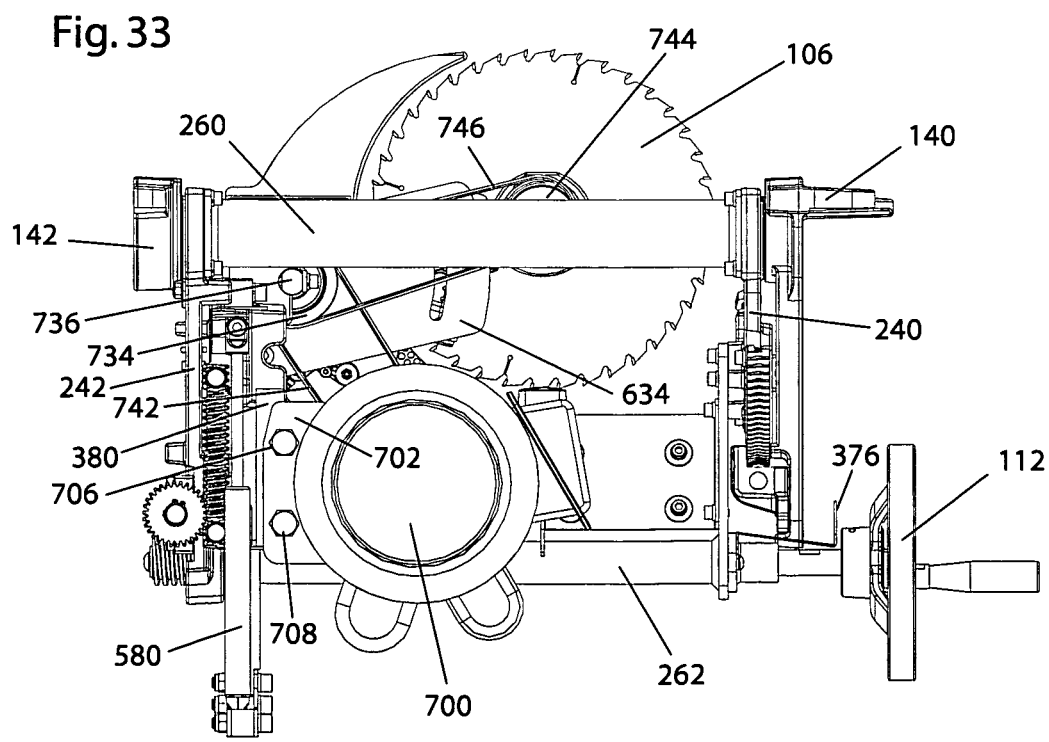
FIG. 33 shows a side view of the internal mechanism of the saw in FIG. 3.
Figure 34:
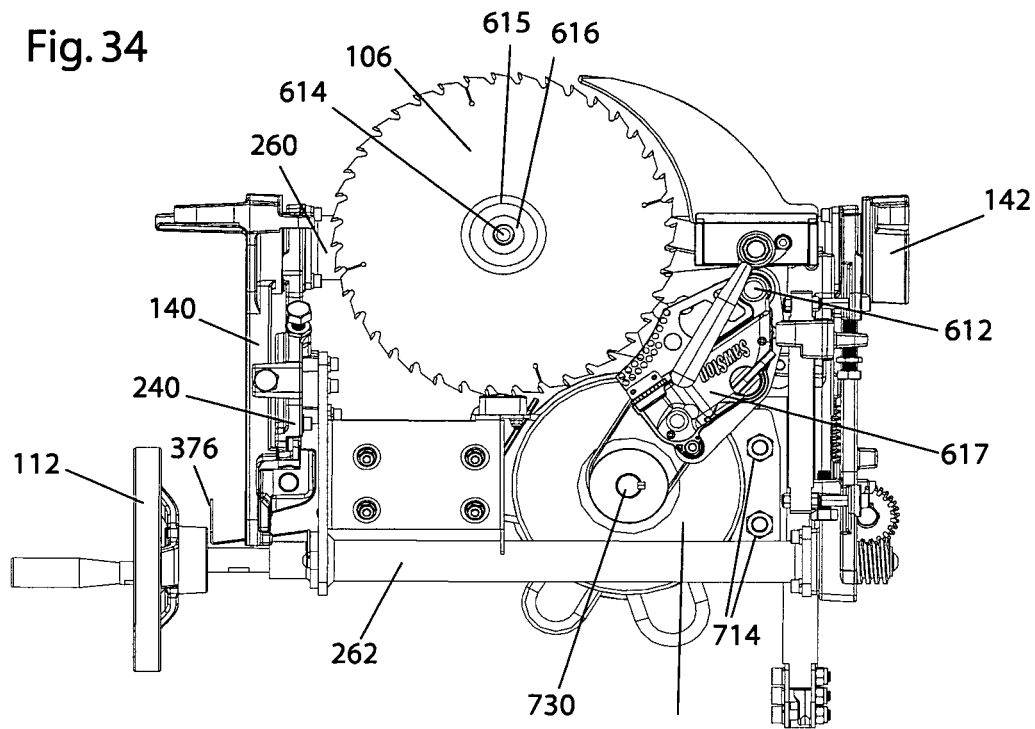
FIG. 34 shows another side view of the internal mechanism of the saw in FIG. 3.

An arbor 614 is mounted for rotation in arbor block 600, as shown in FIG. 26, and the blade of the saw is mounted on the arbor along with a blade washer 615 and blade nut 616 so that it spins when the arbor rotates, as shown in FIGS. 33 and 34. The arbor is held in two bearings that are mounted in bearing seats in the arbor block. The bearings are isolated electrically from the arbor block by plastic overmolding on the arbor or by insulating bushings. Electrodes are positioned adjacent but not touching the arbor to impart the electrical signal to the blade used in the detection subsystem discussed above. The configuration of possible arbors and electrodes are disclosed in detail in U.S. Patent Application Publication Nos. 2005/0039822 A1 and 2007/0101842 A1, both titled "Woodworking Machines With Overmolded Arbors," the disclosures of which are hereby incorporated by reference.

Shaft 612 extends outwardly to the right of the arbor block a sufficient distance so that a brake cartridge 617 may be pivotally mounted on the shaft, as shown in FIG. 34. The brake cartridge is sized and positioned so that it is adjacent the perimeter of a blade having a specified nominal diameter. The brake cartridge includes a pawl, and the pawl pivots toward the blade around shaft 612 to stop the blade from spinning when the detection subsystem detects that a person has contacted the blade, as described above. The brake cartridge may be constructed and mounted in the saw in many ways. Examples of how the brake cartridge may be constructed and mounted in a saw are disclosed in U.S. Patent Application Publication No. 2005/0039586 A1, entitled "Brake Cartridges for Power Equipment," and U.S. Patent Application Publication No. 2005/0139058 A1, entitled "Brake Cartridges and Mounting Systems for Brake Cartridges," the disclosures of which are hereby incorporated by reference. Those publications also disclose how the position of the brake cartridge relative to the perimeter of the blade may be adjusted by a linkage between the arbor block and the mounting structure for the brake cartridge. Arbor block 600 includes an aperture 618 through which a bolt 620 may extend to adjust the spacing between the brake cartridge and the blade.

Brake cartridge 617 also acts as a mechanism to prevent a user of the saw from installing a blade larger than recommended. The brake cartridge physically blocks a large blade from being mounted on the arbor because the blade bumps into the brake cartridge.

A cylindrically-shaped retraction pin 630 (shown in FIG. 27) rests in a recess in a side of arbor block 600 near arbor 614 so that the pin is substantially horizontal and so that the surface of the pin extends beyond the side of the arbor block. Retraction pin 630 engages an arbor block support mechanism to hold the arbor block up and prevent the arbor block from pivoting around shaft 612 during normal operation of the saw. However, when a person accidentally contacts the blade the brake cartridge will engage and stop the blade. The angular momentum of the blade as it is stopped will create a significant downward force and that force will cause retraction pin 630 to disengage from the arbor block support mechanism. When the retraction pin has disengaged, the arbor block will be free to pivot around shaft 612, so the downward force resulting from stopping the blade will cause the arbor block to pivot down very quickly. The blade will also pivot down because the blade is supported by the arbor block. In this manner, the blade will retract below the tabletop of the saw when a person accidentally contacts the blade.

In the depicted embodiment, the arbor block support mechanism takes the form of a flat, roughly rectangular shaped retraction bracket 634 bolted to the elevation plate, as shown in FIG. 28. Bolts 636 and 638 pass through holes in the retraction bracket and thread into corresponding holes 640 and 642 in the elevation plate. The retraction bracket is shaped so that the bolts are spaced apart in such a way as to accommodate the torque necessary to support arbor 614, although other shapes are possible. Retraction bracket 634 extends from the elevation plate toward arbor 614 and forms a type of leaf spring that is thick enough to support the arbor but thin enough to flex slightly. Retraction bracket 634 has a small, rectangular cutout 646 shaped to fit around pin 630 so that the rounded outer surface of the pin protrudes into the cutout. By protruding into the cutout, pin 630 holds the end of the arbor block in place and prevents the arbor block from retracting. Retraction bracket 634 also includes a curved slot 656 and a bolt 648 passes through a washer 650, through a spring 652, through another washer 654, and then through the curved slot to thread into hole 658 in the left side of arbor block 600. Spring 652 exerts a force against retraction bracket 634 to keep the retraction bracket adjacent the arbor and surrounding pin 630. However, when the brake cartridge activates to stop the blade, the downward force caused by the angular momentum of the blade will overcome the force of spring 652 and retraction pin 630 will then push retraction bracket 634 aside and move down with the arbor block as the arbor block pivots downward about shaft 612. Curved slot 656 runs generally vertically and allows bolt 648 to move downward as arbor block 600 pivots downward. The stronger the force that the spring 652 exerts, the harder it is to disengage the retraction pin 630 from cutout 646 in the retraction bracket. This force can be adjusted by turning bolt 648.

A bracket 682 is mounted on secondary torque tube 262 and further supported by vertical plate 268. The bracket is positioned below arbor block 600, as shown in FIG. 28, and a bumper or pad 680 is mounted upon a corner of the bracket. When the arbor block retracts, bumper 680 stops the downward motion of the arbor block and helps absorb the energy of the retraction. The arbor block includes a surface 684 configured to contact bumper 680, as shown in FIG. 28.

The energy of retraction may be significant. Accordingly, bumper 680 may be selected from materials that have good dampening characteristics and arbor block 600 may be made from a ductile iron so that the arbor block it is less likely to be damaged during retraction. Additionally, torque tube 262 should be constructed so that it is sufficiently strong to support bumper 680 and withstand the force of impact with the arbor block, and it is positioned low in the saw to provide clearance for the arbor block and blade to retract.

In some embodiments, bumper 680 and surface 684 may act as a stop to limit the downward motion of the elevation plate, and in those embodiments, they would take the place of stop 422, bolt 432 and shoulder 434 discussed previously.

Figure 29:
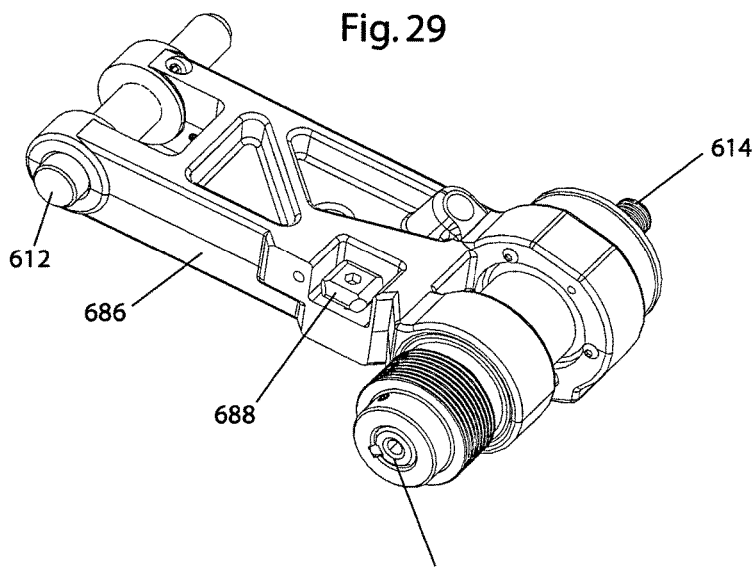
FIG. 29 shows another arbor block.
Figure 30:
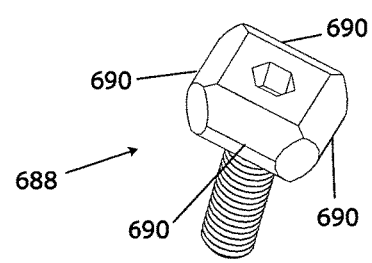
FIG. 30 shows a custom square head bolt.
Figure 31:
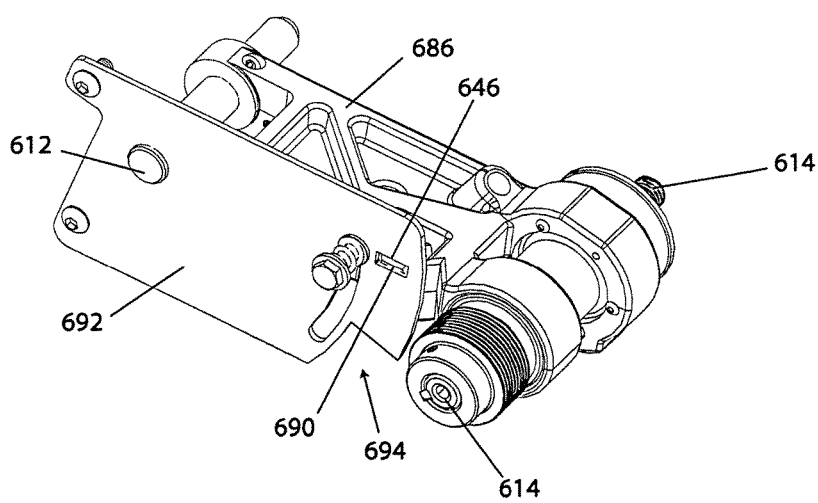
FIG. 31 shows the arbor block of FIG. 29 with another retraction bracket.

Alternative configurations of arbor block 600 and retraction bracket 634 allow the user to adjust the angle at which the arbor block rests when it is supported by the retraction bracket. FIG. 29 shows an alternative arbor block 686 in which retraction pin 630 has been replaced by a custom bolt 688 with a square head. Bolt 688 is shown isolated in FIG. 30. Each side 690 of the square head is rounded like retraction pin 630 and is shaped to fit within cutout 646 in the retraction bracket to support the arbor block. In this alternative configuration, retraction bracket 692 is similar to retraction bracket 634, except the bottom corner below curved slot 656 is removed, as shown by arrow 694 in FIG. 31. Removing the bottom corner of the retraction bracket allows bolt 688 to clear the bottom of the bracket when the arbor block is retracted so that bolt 688 can be turned. Turning the bolt so that it threads farther into or out of the arbor block changes the angle at which the arbor block rests when supported by the retraction bracket. The spacing of the threads on the bolt determines the distance the bolt will travel vertically with each quarter turn of the bolt.

Figure 35:
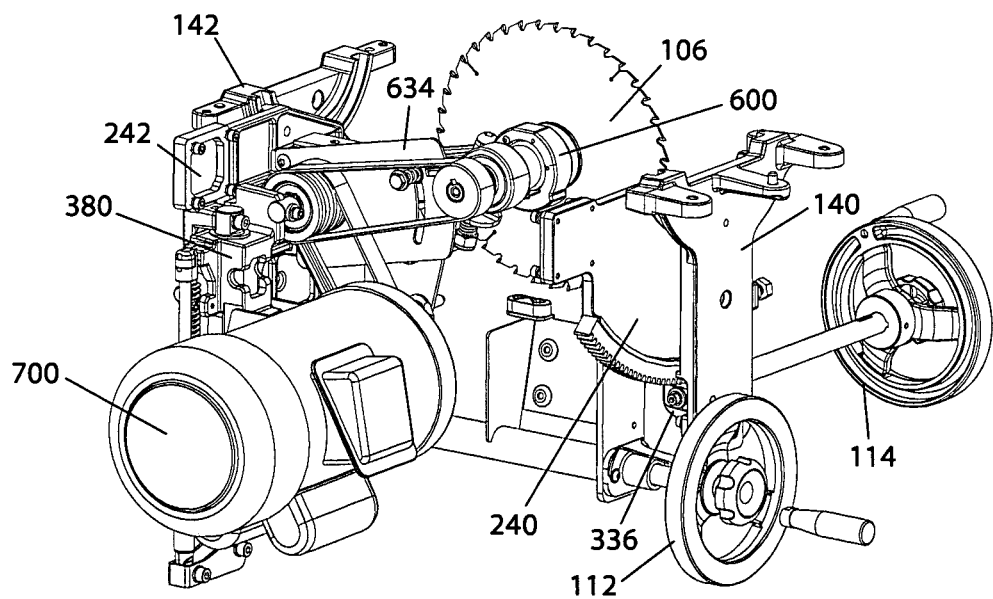
FIG. 35 shows another view of the internal mechanism of the saw of FIG. 3.

Saw 100 is powered by a motor 700 mounted to the front of elevation plate 380. The motor may be mounted to the elevation plate in many ways. In the depicted embodiment, tabs 702, shown in FIG. 32, project out from the motor and sandwich a projection 704 on the front of the elevation plate (projection 704 is labeled in FIG. 28). Bolts 706 and 708, shown in FIG. 33, pass through corresponding holes 710 in the tabs and through oversized holes 712 in the projection. The bolts are then secured with nuts 714 which are welded to the motor tab so only one wrench is needed to install the bolts. Thus, the motor can be mounted to the elevation plate, as shown in FIGS. 33 and 35, by one person with one hand to be free to hold the motor while the other hand tightens bolts 706 and 708.

Tabs 702 on motor 700 are positioned to the side of the motor so that the motor attaches to the elevation plate in such a way that the side-to-side center of gravity of the motor together with all the other parts supported by the elevation plate falls near shaft 390 and threaded rod 460 which support the elevation plate. Threaded rod 460 is positioned near elevation shaft 390 in order to minimize the torque, that is, the rotating force on the elevation shaft. Ideally, shaft 524 of handwheel 112 would extend from the bottom of the threaded rod out to the front of the cabinet. However, this would mean that shaft 524 would need to go through the motor and, even so, the position of handwheel 112 would not be optimal. Shaft 524 of handwheel 112 should be located so that handwheel 112 is towards the center of the front of the cabinet and sufficiently below the table so that users can turn the handwheel without hitting their knuckles on the underside of the table. Additionally, because shaft 524 moves with the trunnions as they tilt, it should be positioned below shaft 332 of tilt handwheel 114 so that it clears front trunnion bracket 140. The presence of shaft 482 and the positioning of worm gear 520 and worm 522 behind the rear trunnion bracket allow flexibility in choosing the placement of handwheel 112. Both the handwheel and the threaded rod 460 can be placed in the optimal positions and the length of shaft 482 sized accordingly.

Figure 32:
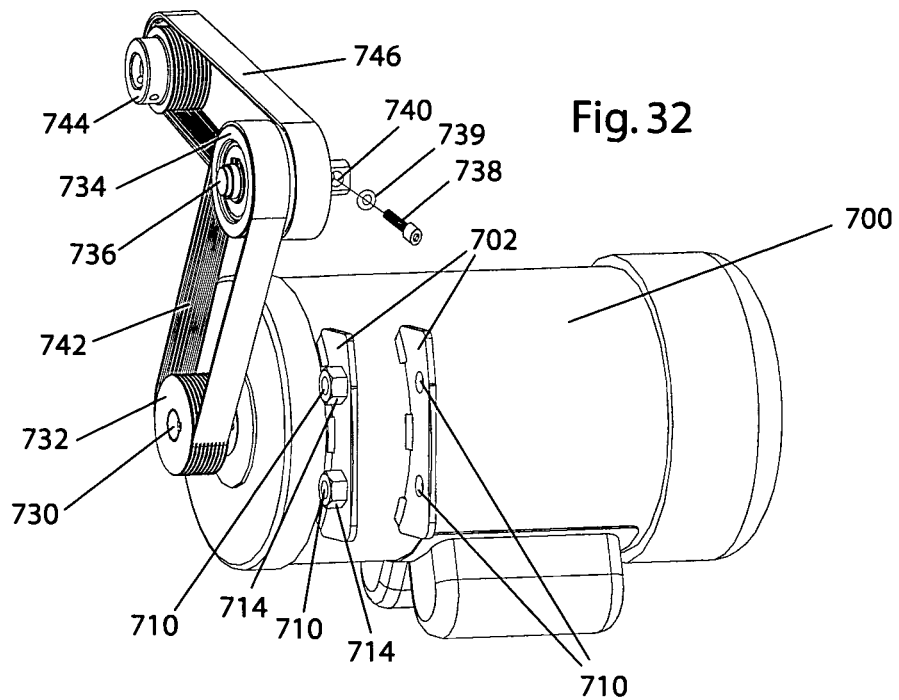
FIG. 32 shows a motor and pulley assembly.

The motor drives arbor 614 through a two-belt system. A short shaft 736 is bolted at one end to the front of the elevation plate by a bolt 738 which passes through a washer 739 and a hole 740 in shaft 736, as shown in FIG. 32. Bolt 738 then threads into a hole 741 in the elevation plate which can best be seen in FIG. 28. The end of shaft 736 opposite hole 740 has a small protrusion of a slightly smaller diameter that is configured to fit within a hole 740 in retraction bracket 634. A double pulley 734 is mounted on shaft 736 between the ends of the shaft. The double pulley includes an inner belt track adjacent retraction bracket 634 and an outer belt track. The motor has a drive shaft 730 and a motor pulley 732 is mounted on the drive shaft. A first belt 742 extends around the motor pulley and the inner belt track of the double pulley. An arbor pulley 744 is mounted on the end of arbor 614, opposite the blade, and a second belt 746 extends around arbor pulley 744 and the outer track of double pulley 734. Motor 700 turns pulley 732, which then turns double pulley 734 and arbor pulley 744, causing the blade mounted on the arbor to spin. Shaft 736 is offset slightly from shaft 612 about which the arbor block pivots so that when the arbor block retracts, belt 746 is slightly loosened. This allows the belt to be changed more easily. Offsetting the axis of shaft 736 from the axis of shaft 612 also allows belt 746 to slip when the brake cartridge stops the blade and the arbor block retracts, which possibly allows the blade to stop more quickly and which helps prevent polishing or other damage to the belt if the motor continues spinning for a short period of time after the blade stops.

Shaft 736 can be removed as necessary for changing belts by removing bolt 738 and slipping it out of the retraction bracket. Pulleys 734 and 744 are fixed-center pulleys, so a slightly stretchy Poly-V belt designed for fixed center pulleys is used. A slightly stretchy belt has the advantage of being able to stretch to meet manufacturing tolerances. The depicted embodiment includes a double belt system as described so that arbor block 600 may retract by pivoting down around shaft 612 without disengaging from the drive belts.

The belt around pulley 744 is preferably made of a static dissipative material so that static charge does not build up on the arbor or blade. This is advantageous because in some implementations a static charge may interfere with the detection subsystem. The pulleys may be sized so that the blade spins at a desired speed, such as 4000 rpm, while the motor spins at a different speed, such as 3450 rpm.

The belt extending around the motor pulley and the inner track of double pulley 734 may be tensioned by adjusting the position of the motor. As mentioned earlier, motor 700 is mounted to the elevation plate by two bolts which pass through oversized holes 712 in the elevation plate. The oversized holes allow some flexibility in the vertical position of the motor. To put tension on the belt, bolts 706 and 708 are loosened and the motor is moved up or down, that is, closer to or farther from the double pulley, until the belt is at the right tension. When the desired tension is achieved, the bolts are tightened to hold the motor in position.

Figure 36:
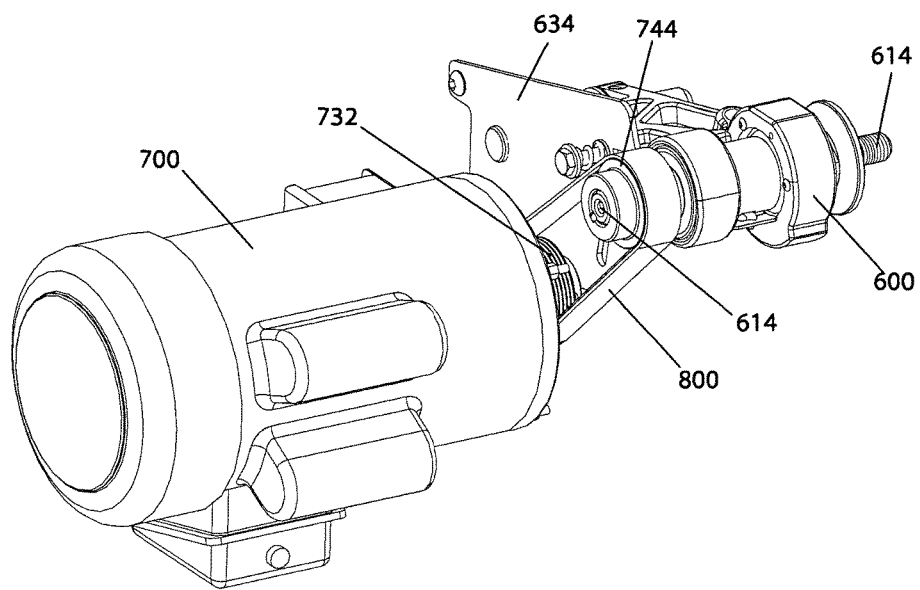
FIG. 36 shows a saw configuration using one belt to drive the arbor shaft.

In an alternative configuration, the motor may drive arbor 614 directly through a one-belt system, as shown in FIG. 36. In this configuration, belt 800 wraps around motor pulley 732 and arbor pulley 744, and the motor is positioned to keep some tension on the belt when the arbor retracts.

Saw 100 may include a shroud shaped to partially enclose the blade under table 102. Shrouding the blade prevents a person from contacting the blade under the table. This is useful because if a person contacts the blade under the table, the brake cartridge will fire and the blade will retract, possibly into the person's hand. Shrouding the blade also helps to collect sawdust created when the saw is running.

Figure 37A:
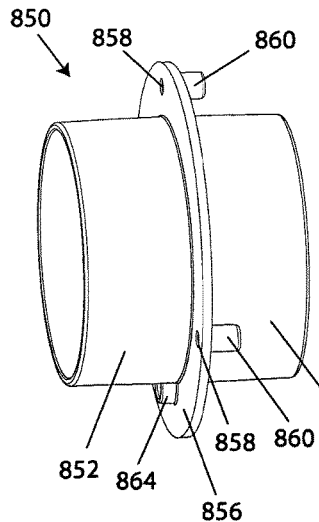
FIG. 37A shows a dust port.
Figure 37B:
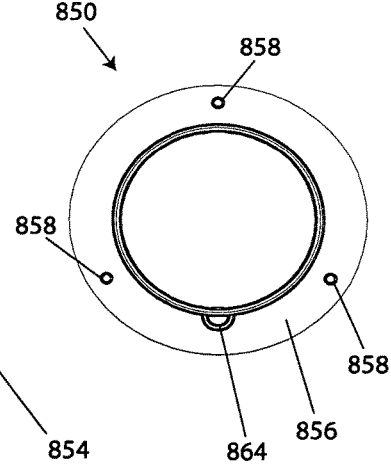
FIG. 37B shows another view of the dust port in FIG. 37A.
Figure 37C:
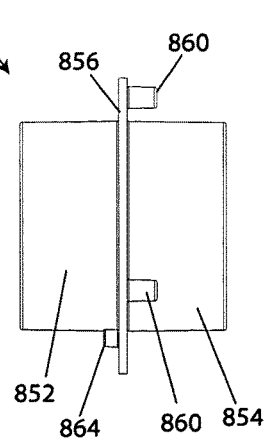
FIG. 37C shows a side view of the dust port of FIG. 37A.

A dust port 850 is shown on the back of the cabinet in FIG. 38 and is shown isolated in FIGS. 37A, 37B and 37C. FIG. 37B shows a front view of the dust port and FIG. 37C shows a side view of the dust port. The dust port consists of a front tube 852 which extends out from the saw, and a back tube 854 which extends into the saw. A flange 856 spans around the middle of the tubes and extends outward. Flange 856 is used to mount the dust port to the saw. The flange includes three holes 858 with corresponding bosses 860 formed on the backside of the flange. The bosses are designed to accommodate thread-forming fasteners. During assembly, the dust port is carried inside the cabinet and front tube 852 is inserted through a hole in the back of the cabinet. Three small holes 862 are positioned in the cabinet to align with holes 858 in the dust port flange, and fasteners or screws pass through holes 862 and 858 and thread into bosses 860 to mount the dust port to the cabinet. A small semicircle 864 protrudes on the backside of flange 856 and functions as a key to easily orient the dust port so that the three bosses on the dust port line up with the three holes in the cabinet. Because the dust port is a separate part from the cabinet, a user can choose to install a dust port with front tube 852 having either a four inch or two inch outer diameter, depending on the dust collection system that will be attached to the dust port.

The cabinet of the table saw may include openings to allow access to the internal mechanism of the saw. FIG. 3 shows saw 100 with a cover 900 over such an opening. The cover is designed to fit around the motor, as shown in FIG. 38, taking into account that the position of the motor will change as the blade tilts. Cover 900 is mounted to the cabinet with a hinge so it can pivot open, as shown in FIG. 4. The hinge is effectively a pin-and-barrel type of hinge comprised of a row of alternating half-cylinders 902 integrated along the back edge of the plastic cover, a metal rod 904, and two short metal tubes 906 welded, screwed, or otherwise attached to the side of the cabinet. Rod 904 slides through the lower metal tube 906, through the alternating half-cylinders 902 and then through the upper metal tube 906, as shown in FIG. 39. An L-shaped hook 910 is integrated into the plastic cover, as shown in FIG. 40, and is positioned just below the lower metal tube 906. Rod 904 has a bent end 912 which can be rotated and positioned within hook 910 so that the rod is held in place. The hinge is designed so that it has only a few parts and so that it can easily be assembled without the need of extra tools. A latch 914, shown in FIG. 41, is integrated on the front of cover 900 to keep the cover closed. The latch includes an area 916 along the middle of the front edge of cover 900 that provides a place for a hand to press upon. Area 916 is set apart by two notches 918 and 920 cut horizontally inward from the edge of the cover to relieve stress, and it has ribs 922 for strength. Area 916 extends past the edge of cover 900 and bends to form a lip 924, shown in FIGS. 41 through 43, to catch the inner edge of the cabinet in order to keep the cover closed. Lip 924 is made stronger by having a triangular shape, as shown at 926 in FIG. 43. The cover can be opened by pressing upon area 916 which flexes area 916 inward and moves lip 924 out from behind the cabinet edge so that the cover is free to pivot open. To close and latch the cover, the user presses upon area 916 so that the triangular shape of lip 924 engages the edge of the cabinet. The slope of the side of the triangular shape helps cause area 916 to flex inward as the cover is pushed towards the cabinet. Once the lip is past the edge of the cabinet, it snaps into place behind the edge, thus latching the cover closed. An extension 928 at the base of the cover fits into a corresponding rectangular slot 930 in the cabinet to help align the cover to the cabinet.

Cover 900 is made of a rigid material, such as plastic or metal, and may include louvers to allow airflow into the cabinet. A flange 932, best seen in FIGS. 39 and 42, runs along the outside edge of the cover. The cover may be designed so that when it is closed, there is a small gap between flange 932 and the cabinet to reduce noise that could otherwise result from the vibration of the saw. In order to reduce noise caused by vibration in the area where the motor cover latches to the cabinet, foam may be placed on the underside of flange 932 above and below latch 914 as indicated by arrows 934 in FIG. 41. Flange 932 continues around area 916, as shown, to provide strength and rigidity around the area.

Saw 100 also includes a switch box 950 with one or more switches to control the operation of the saw. A switch box designed for use with safety systems as described above is described in detail in U.S. Patent Application Publication No. 2005/0139459 A1, entitled "Switch Box for Power Tools with Safety Systems," the disclosure of which is hereby incorporated by reference.

Saw 100 may also come with a fence 952 that rests on table 102 and clamps to a front rail. The fence provides a face against which a user may slide a work piece when making a cut. One possible fence is disclosed in U.S. Patent Application Publication No. 2005/0139046 A1, entitled "Fences for Table Saws," the disclosure of which is hereby incorporated by reference.

Saw 100 may also come with a riving knife. A riving knife sits behind the blade and functions to prevent a work piece from engaging the teeth at the back of the blade. As a work piece is cut into two sections, the newly cut sections may flex or move. If one of the newly cut sections moves to the side and catches the back edge of the spinning blade, the blade may suddenly kick the work piece back toward the user at a very high speed and the user's hand may be pulled into the blade by the sudden movement of the work piece. The riving knife impedes the work piece from moving to the side and thereby minimizes the chance of the work piece catching the back edge of the blade. The riving knife also minimizes the chance of newly cut sections of a work piece moving together and binding the blade. One possible riving knife and systems to mount the riving knife in the saw are disclosed in U.S. Patent Application Publication No. 2005/0166736 A1, entitled "Table Saws With Safety Systems and Systems to Mount and Index Attachments", the disclosure of which is hereby incorporated by reference.

The saw may also come with a blade guard, miter gauge and blade wrenches.

INDUSTRIAL APPLICABILITY

The systems, mechanisms and components disclosed herein are applicable to power equipment, and particularly to table saws, including cabinet saws, contractor saws, hybrid saws, jobsite saws, and bench top saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element of the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:
a table to support a workpiece;
a blade able to extend at least partially through the table to cut a workpiece on the table;
an arbor block adapted to support the blade and pivot downward relative to the table around a pivot axis to retract the blade; and
a drive mechanism to spin the blade, where the drive mechanism includes a motor, a motor pulley, a double pulley, an arbor pulley, a first belt extending around the motor pulley and double pulley, and a second belt extending around the double pulley and arbor pulley, where the double pulley is supported in the saw to rotate around an axis offset from the pivot axis.

2. A table saw comprising:
a table to support a workpiece;
a blade extending at least partially through the table;
where the table and blade are configured so that a workpiece is cut by a user causing the workpiece to move into contact with the blade in a feed direction; and
an elevation mechanism configured to adjust the height of the blade relative to the table, where the elevation mechanism includes a handwheel and handwheel shaft, where the user applies a force to operate the elevation mechanism by turning the handwheel, where turning the handwheel turns the handwheel shaft, where the elevation mechanism further includes a transfer mechanism to transmit the force applied by the user to operate the elevation mechanism from the handwheel shaft to a position generally lateral to the handwheel shaft;
where the transfer shaft is behind the blade relative to the feed direction.

* * * * *